(12) United States Patent
Tomita et al.

(10) Patent No.: US 10,215,494 B2
(45) Date of Patent: Feb. 26, 2019

(54) METHOD OF OPERATING ELECTRIC ARC FURNACE

(71) Applicant: DAIDO STEEL CO., LTD., Nagoya-shi, Aichi (JP)

(72) Inventors: Noriyuki Tomita, Aichi (JP); Yoshikazu Tanaka, Aichi (JP); Akihiro Nagatani, Aichi (JP); Masato Ogawa, Aichi (JP); Kunio Matsuo, Aichi (JP)

(73) Assignee: DAIDO STEEL CO., LTD., Aichi (JP)

( * ) Notice: Subject to any disclaimer, the term of this patent is extended or adjusted under 35 U.S.C. 154(b) by 340 days.

(21) Appl. No.: 14/930,775

(22) Filed: Nov. 3, 2015

(65) Prior Publication Data

US 2016/0123664 A1 May 5, 2016

(30) Foreign Application Priority Data

Nov. 5, 2014 (JP) .................. 2014-225630
Nov. 5, 2014 (JP) .................. 2014-225634

(51) Int. Cl.
*F27B 3/08* (2006.01)
*F27D 3/15* (2006.01)
(Continued)

(52) U.S. Cl.
CPC ............... *F27B 3/085* (2013.01); *F27B 3/06* (2013.01); *F27B 3/205* (2013.01); *F27D 3/1518* (2013.01); *F27D 11/10* (2013.01)

(58) Field of Classification Search
CPC ...... F27B 2005/143; F27B 3/085; F27B 3/10; F27B 3/12; F27D 11/08; F27D 2099/0098; F27D 3/0025; H05B 7/14
See application file for complete search history.

(56) References Cited

U.S. PATENT DOCUMENTS 1,378,972 A    5/1921   Moore
2,686,961 A    8/1954   Ellefsen
(Continued)

FOREIGN PATENT DOCUMENTS

CN    1070302    3/1993
CN    1072459    5/1993
(Continued)

OTHER PUBLICATIONS

US 5,883,917, 03/1999, Mathur et al. (withdrawn)
(Continued)

*Primary Examiner* — Colleen P Dunn
*Assistant Examiner* — Nicholas A Wang
(74) *Attorney, Agent, or Firm* — Greenblum & Bernstein, P.L.C.

(57) ABSTRACT

The present invention relates to a method of operating an electric arc furnace containing (a) a furnace shell having a tapping hole and/or a slag door, (b) a furnace roof having a plurality of electrodes provided so as to face downwards, and (c) a rotating apparatus that rotates the furnace shell around a vertical axis relative to the electrodes, the method contains a rotating step of rotating the furnace shell relative to the electrodes during melting of a metal material, and a holding step of stopping the rotation when any one of the plurality of electrodes reaches a holding position that is previously set close to the tapping hole or the slag door, and holding the furnace shell at the holding position.

8 Claims, 17 Drawing Sheets

(51) Int. Cl.
   *F27D 11/10* (2006.01)
   *F27B 3/06* (2006.01)
   *F27B 3/20* (2006.01)

(56) References Cited

U.S. PATENT DOCUMENTS

| | | | |
|---|---|---|---|
| 2,907,807 A | | 10/1959 | Noesen |
| 3,237,930 A | * | 3/1966 | Hofmann .................. C21C 5/52 373/2 |
| 3,955,964 A | | 5/1976 | MacDonald |
| 3,980,801 A | | 9/1976 | Milasius |
| 4,110,546 A | * | 8/1978 | Stenkvist .............. C21C 5/5229 373/107 |
| 4,228,314 A | | 10/1980 | Stenkvist |
| 4,638,487 A | | 1/1987 | Tomizawa |
| 4,662,526 A | | 5/1987 | Schaller |
| 4,679,773 A | * | 7/1987 | Wunsche .............. F27D 3/1509 266/217 |
| 4,694,465 A | | 9/1987 | Nanjo |
| 4,965,813 A | * | 10/1990 | Udo ...................... C21C 5/5217 373/2 |
| 5,153,894 A | | 10/1992 | Ehle |
| 5,264,020 A | | 11/1993 | Ehle |
| 5,274,663 A | | 12/1993 | Stenkvist |
| 5,471,495 A | | 11/1995 | Berger et al. |
| 5,573,573 A | | 11/1996 | Berger et al. |
| 5,756,957 A | | 5/1998 | Titus |
| 6,125,133 A | | 9/2000 | Mathur et al. |
| 6,274,081 B1 | | 8/2001 | Fuchs |
| 6,377,605 B1 | * | 4/2002 | McCaffrey ............. H05B 7/101 373/100 |
| 6,393,043 B1 | | 5/2002 | Fuchs |
| 2002/0110175 A1 | | 8/2002 | Stercho |
| 2013/0336353 A1 | | 12/2013 | Krepel et al. |
| 2016/0003542 A1 | | 1/2016 | Huang et al. |

FOREIGN PATENT DOCUMENTS

| | | |
|---|---|---|
| CN | 1131197 | 9/1996 |
| CN | 1198525 | 11/1998 |
| CN | 1302370 | 7/2001 |
| CN | 103075881 | 5/2013 |
| CN | 103185463 | 7/2013 |
| CN | 103509954 | 1/2014 |
| CN | 203657484 | 6/2014 |
| CN | 103954133 | 7/2014 |
| EP | 2799799 | 11/2014 |
| JP | 57-167397 | 4/1954 |
| JP | 56-008295 | 6/1954 |
| JP | 59-001613 | 1/1984 |
| JP | 60-122886 | 7/1985 |
| JP | S60122886 | * 7/1985 |
| JP | 04-217783 | 8/1992 |
| JP | 7-190624 | 7/1995 |
| JP | 2014-40965 | 3/2014 |

OTHER PUBLICATIONS

Applicants' admitted prior art, Backgroun section [0002-0012, fig. 12a-b].*
Office Action issued in U.S. Appl. No. 14/930,809, dated Jul. 28, 2017.
U.S. Appl. No. 14/930,793 to Noriyuki Tomita et al., filed Nov. 3, 2015.
U.S. Appl. No. 14/930,809 to Kota Mizutani et al., filed Nov. 3, 2015.
U.S. Appl. No. 14/930,823 to Kota Mizutani et al., filed Nov. 3, 2015.
Office Action issued in U.S. Appl. No. 14/930,809, dated Jan. 13, 2017.
Official Action issued in U.S. Appl. No. 14/930,793 dated Nov. 16, 2017.
Office action dated Apr. 12, 2018 issued in corresponding Taiwanese patent application No. 104136523, and translation.
Office action dated Apr. 12, 2018 issued in corresponding Taiwanese patent application No. 104136524, and translation.
Office Action issued in Japan Counterpart Patent Appl. No. 2014-225630, dated Aug. 16, 2018 , along with an English translation thereof.
Office Action issued in China Counterpart Patent Appl. No. 201510751116.3, dated Jul. 10, 2018 , along with an English translation thereof.
Office Action issued in China Counterpart Patent Appl. No. 201510751119.7, dated Jul. 11, 2018 , along with an English translation thereof.
Office Action issued in China Counterpart Patent Appl. No. 201510745545.X, dated Jul. 16, 2018 , along with an English translation thereof.
Office Action issued in China Counterpart Patent Appl. No. 201510751128.6, dated Jul. 25, 2018 , along with an English translation thereof.
Office Action issued in Japan Counterpart Patent Appl. No. 2014-225634, dated Sep. 4, 2018 , along with an English translation thereof.
Office action dated Dec. 21, 2017 from related U.S. Appl. No. 14/930,823.

* cited by examiner

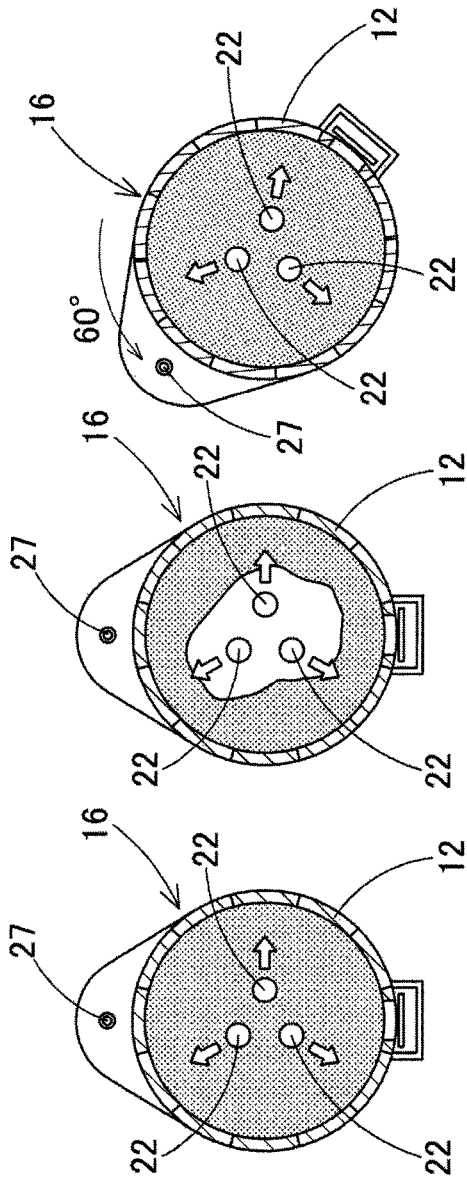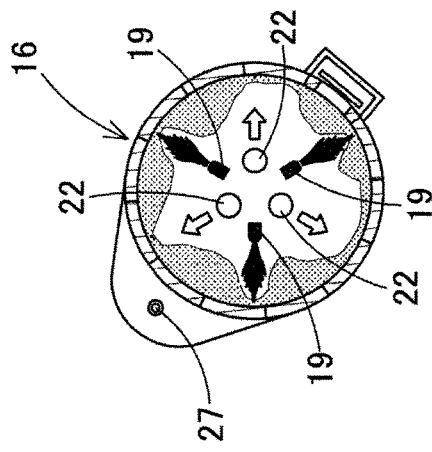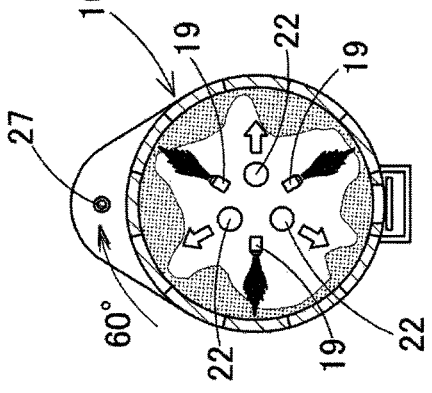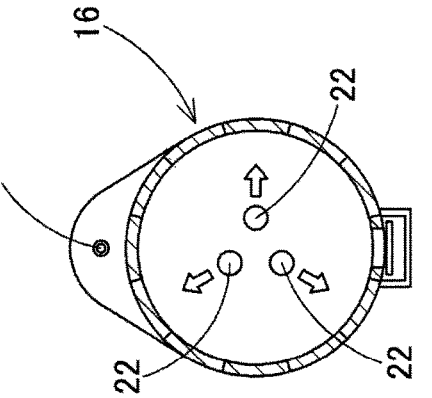
FIG. 14A  FIG. 14B  FIG. 14C  FIG. 14D  FIG. 14E  FIG. 14F

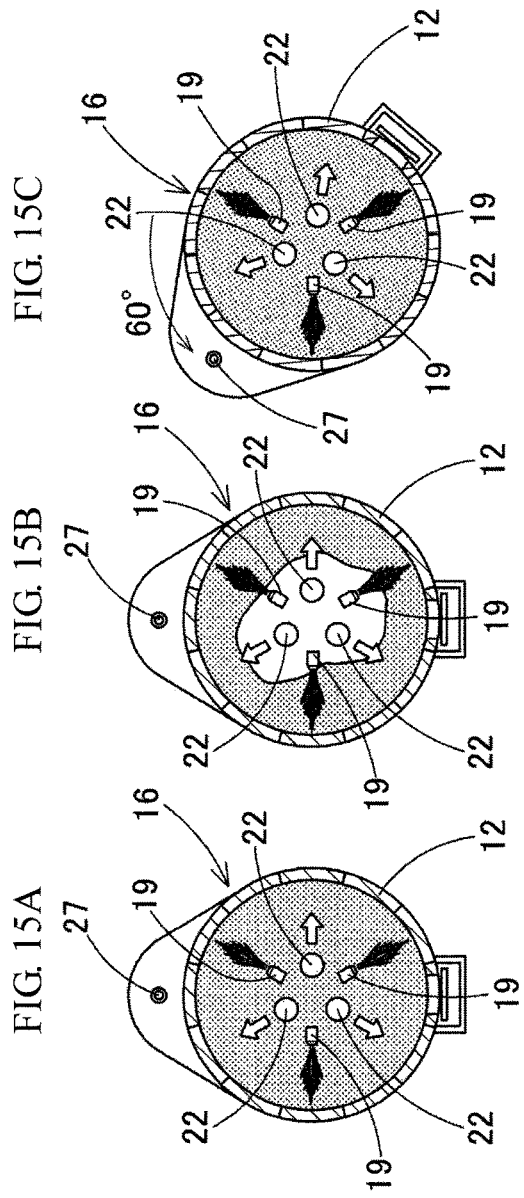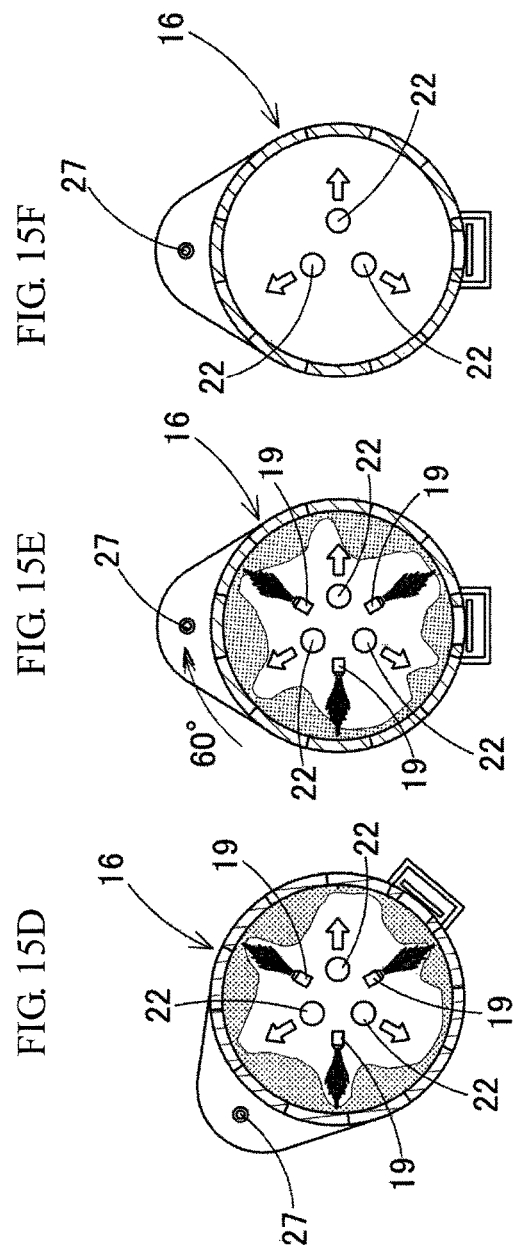

METHOD OF OPERATING ELECTRIC ARC FURNACE

FIELD OF THE INVENTION

The present invention relates to a method of operating an electric arc furnace, and specifically, relates to a method of operating an electric arc furnace with a rotating apparatus that rotates a furnace shell relative to an electrode.

BACKGROUND ART OF THE INVENTION

Conventionally, a three-phase alternating current arc furnace in which arcs are produced between a metal material in a furnace shell and three electrodes inserted into the furnace shell to melt the metal material by arc heat is widely used as a melting furnace for melting metal materials such as metal scrap.

In the melting operation of a metal material using such an electric arc furnace, conventionally, there arises a problem of non-uniform melting of the metal material.

In the three-phase alternating current electric arc furnace, three electrodes inserted downwards into the furnace shell are disposed so as to form a triangle around the central axis of the furnace shell in a planar view, that is, disposed so that the three electrodes are respectively positioned at the apices of the triangle.

As a result, in the furnace shell, there exist so-called hot spots at positions with a short distance from the electrodes (that is, close to the electrodes), and so-called cold spots at positions with a long distance from the electrodes (that is, distant from the electrodes).

The metal material at the hot spots is easily melted since the metal material at the hot spots is strongly heated by the electrodes, but the heating by the electrodes is relatively weak at the cold spots. This causes ununiform melting that the metal material at the cold spots remains unmelted even after the metal material at the hot spots is completely melted.

Due to such a ununiform melting, there arise some problems. One problem is, for example, that melting efficiency is worse and the cost for electricity required for melting goes up. Another problem is, for example, that even after the metal material at the hot spots is completely melted, powerful heat is continuously applied during the metal material at the cold spots is continuously being melted, and thus investment of excessive electricity is necessary, melt-erosion of a refractory material of a furnace wall accelerates, and a melt-eroded portion of the refractory material has to be repaired in short cycles.

As a countermeasure against these problems, there has been proposed an electric arc furnace which makes a furnace shell rotate relative to fixed electrodes, or an electric arc furnace which makes electrodes rotate relative to a fixed furnace shell.

For example, the former electric arc furnace is disclosed in Patent References 1 and 2, and the latter electric arc furnace is disclosed in Patent Reference 3.

The electric arc furnace with a rotating apparatus as above can move the position of a metal material originally placed at a cold spot to a hot spot, and a metal material originally placed at a hot spot to a cold spot by rotating the furnace shell relative to the electrodes during melting, and thus the problem of ununiform melting can be remedied.

At this time, it is effective to place the electrode originally positioned in a center region in a circumferential direction of a hot spot into a center region in the circumferential direction of an adjacent cold spot by rotating the furnace shell relative to the electrode by approximately 60° in the circumferential direction.

In order to confirm an in-furnace state of the electric arc furnace during operation, the present inventors have stopped the melting operation once, cooled the furnace and examined the inside thereof, and as a result, they have found that unmelted residue of the metal material is present in the vicinity of a tapping hole or a slag door of the furnace shell.

The cause of the formation of unmelted residue in the vicinity of the tapping hole differs according to the type of a furnace.

FIG. 12A and FIG. 12B are views illustrating the unmelted residue of a metal material in an eccentric bottom tapping electric arc furnace (EBT furnace).

A reference numeral 80 represents an EBT furnace having a furnace shell 82, which has a furnace bottom portion 84 partially protruding outwards from an inner surface of a circular circumferential wall portion 85 of the furnace shell 82 further than an outer surface of the circumferential wall portion 85 in a radial direction to form a protruding portion 86. The protruding portion 86 forms a shelf-like portion with a small gradient, and thereon is formed an opening, that is, a tapping hole 88, which passes therethrough in a vertical direction. The tapping hole 88 is blocked with a cover, which is not illustrated, at the outside on a lower side of the protruding portion 86.

In the EBT furnace 80 with such a configuration, when the metal material is charged into the inside of the furnace shell 82 via a charging opening 95 at an upper end thereof, a part of the metal material may be mounted on the shelf-like protruding portion 86 in the vicinity of the tapping hole 88. It is considered that since the part of the metal material mounted on the protruding portion 86 is positioned with a long distance from electrodes 83 and is weakly heated, the metal material at that part remains unmelted until tapping. A reference numeral 87 in of FIG. 12B illustrates unmelted residue formed in the vicinity of the tapping hole 88.

In the EBT furnace 80, unmelted residue of metal material may be formed in the vicinity of a slag door 91 that is disposed opposite to the tapping hole 88 in the radial direction, in some cases.

The EBT furnace 80 has the slag door 91 that passes through the circumferential wall portion 85 of the furnace shell 82 in an inward and outward direction, and a slag-door bottom portion 92 that extends outwards from the slag door 91 in the radial direction. The slag door 91 may be blocked with a door or the like, but, during a melting operation, external air can infiltrate into the furnace via the slag door 91 (via a gap when blocked with the door), and as illustrated by the arrow in of FIG. 12B, cool air may flow inside the furnace from the slag door 91 toward a dust collection hole 94 attached to a furnace roof 93. For this reason, it is considered that the metal material inside the furnace is cooled in the vicinity of an end portion of the slag door 91 at a side close to the dust collection hole 94 and thus unmelted residue 96 is formed.

On the other hand, also in the case of a spout tapping electric arc furnace having a tapping hole that passes through a circumferential wall portion of a furnace shell in a radial direction and a spout that extends outwards from the tapping hole in the radial direction, the tapping hole is kept in an open state during a melting operation, and thus external air infiltrates into the furnace therethrough. It is considered that, for this reason, due to the same cause as for the slag door 91 in the EBT furnace, a metal material inside the furnace is cooled and remains unmelted in the vicinity of the tapping hole.

Also, in the vicinity of a slag door in the spout tapping electric arc furnace, the metal material remains unmelted similar to the vicinity of the slag door 91 in the EBT furnace.

The tapping hole and the slag door as described above are generally positioned neither in a center region of a cold spot nor in a center region of a hot spot during the operation of the electric arc furnace. Therefore, it is difficult to satisfactorily melt the metal material, which has remained unmelted around the tapping hole or the slag door, by the operation merely switching the hot spot and the cold spot by means of relative rotation between the furnace shell and the electrodes.

Naturally, in the operation of an electric arc furnace which does not perform the switching between hot spots and cold spots by a rotation using a rotating apparatus, it becomes more difficult to satisfactorily melt the metal material which has remained unmelted around a tapping hole or a slag door.

As another countermeasure against the above-described problems, there has been proposed, as illustrated in FIG. 17A and FIG. 17B, that burners 106 are fixedly attached to a circumferential wall portion 104 of a furnace shell 102 to face inwards in the furnace at a position in a center region of each of the cold spots in a circumferential direction and, a metal material M at the cold spots is melted by a flame from the burner 106.

As illustrated in FIG. 17B, when the burner 106 can bring a flame into direct contact with the stacked metal material immediately in front of the burner 106 at an initial stage, the metal material M can be satisfactorily melted. However, in contrast, as illustrated in FIG. 17C, after the metal material immediately in front thereof is melted, the flame from the burner 106 cannot be brought into direct contact with the remaining metal material, and the remaining metal material is heated only by heat in the atmosphere.

For this reason, the heating of the remaining metal material M by the burner 106 becomes weak rapidly, and thus, heating efficiency by the burner 106 for the material at the cold spot is worse, the melting time in the electric arc furnace is prolonged, and a large amount of heating energy is required, and thus, there arises a problem that the total costs go up.

It is possible to expand a heating range by increasing the number of burners; however, in this case, energy cost becomes worse, and thus it has been deemed to be not practical.

Patent Reference 1: JP-A-S60-122886
Patent Reference 2: JP-A-2014-40965
Patent Reference 3: JP-A-H07-190624

SUMMARY OF THE INVENTION

The present invention has been made in light of these circumstances. An object of the present invention is to provide a method of operating an electric arc furnace, in the operation of an electric arc furnace in which a metal material is melted, which can improve melting efficiency by effectively preventing the formation of unmelted residue particularly in the vicinity of a tapping hole or a slag door.

That is, the present invention provides a method of operating an electric arc furnace,
in which the electric arc furnace includes:
(a) a furnace shell that includes a charging opening, a cylindrical circumferential wall portion and a furnace bottom portion, and a tapping hole and/or a slag door,
(b) a furnace roof that has a plurality of electrodes provided so as to face downwards, and
(c) a rotating apparatus that rotates the furnace shell around a vertical axis relative to the electrodes,
in which a metal material charged into the furnace shell is melted by heat of arcs formed between the electrodes and the metal material,
in which the method contains:
a charging step of charging the metal material into the furnace shell via the charging opening, and thereafter,
a rotating step of rotating the furnace shell relative to the electrodes during melting of the metal material, and
a holding step of stopping the rotation when any one of the plurality of electrodes reaches a holding position that is previously set close to the tapping hole or the slag door, and holding the furnace shell at the holding position.

The electric arc furnace may be an EBT furnace having the tapping hole, in which the furnace bottom portion has a protruding portion that partially protrudes outwards from an outer surface of the circumferential wall portion in a radial direction, and the tapping hole is configured by an opening that passes through the protruding portion in a vertical direction.

The electric arc furnace may be a spout tapping electric arc furnace having the tapping hole, in which the tapping hole is configured by an opening that passes through the circumferential wall portion in an inward and outward direction, and the spout tapping electric arc furnace has a spout extending outwards from the tapping hole.

The rotating apparatus may make the furnace shell rotate in a circumferential direction while the electrodes are fixed with respect to a rotational direction. Further, in the rotating step, the furnace shell may be made rotate in a circumferential direction while the electrodes are fixed with respect to a rotational direction.

The rotating step may be performed after the electrode bores the scrap.

The charging step may be performed multiple times.

In the method of operating an electric arc furnace according to the present invention, the electric arc furnace may further include a burner provided on the furnace roof so as to face downwards in a position between the electrodes which are adjacent to each other in a circumferential direction, and the rotating step may be a step of rotating the furnace shell relative to the electrodes and the burner during melting of the metal material.

As described above, in the method of operating an electric arc furnace according to the present invention, a furnace shell is made rotate relative to electrodes during melting of a metal material, stopped its rotation when any one of the plurality of electrodes reaches the holding position that is set close to a tapping hole or a slag door so as to melt the metal material in the vicinity of the tapping hole or the slag door, and held at the holding position to melt the metal material in the vicinity of the tapping hole or the slag door. Thus, according to the present invention, the metal material in the vicinity of the tapping hole or the slag door can be effectively heated by the electrodes, and as a result, it is possible to satisfactorily solve the problem of the unmelted residue of the metal material that is conventionally caused in the vicinity of the tapping hole or the slag door.

The present invention is suitably applicable to an operation by using any type of electric arc furnaces described hereinbelow. At this time, the holding position, which is set close to a tapping hole or a slag door, varies according to the type of an electric arc furnace, that is, the types and structures of the tapping hole and the slag door, or the like.

Conventionally, the EBT furnace and the spout tapping electric arc furnace are mainly used as the electric arc furnace.

In the former case (EBT furnace), the holding position, which is set close to a tapping hole, is desirably set in such a position that an extension line of a line connecting a rotational center of a furnace shell to any one of electrodes passes through a region between one circumferential end and the other circumferential end of a protruding portion positioned in the vicinity of the tapping hole.

That is, the holding position, which is set close to a tapping hole, is desirably set in such a position that when an angle formed between a line connecting the one circumferential end of the protruding portion to the rotational center of the furnace shell and a line connecting the other circumferential end to the rotational center is taken as $\alpha$, the line connecting the rotational center to any one of the electrodes desirably passes through within a region defined by the angle $\alpha$ (typically, $\alpha$=approximately 100°).

More preferred is within a range of $\pm\alpha/4$, with a line passing through the exact center of the angle $\alpha$ being centered, and further preferred is within a range of $\pm\alpha/6$.

In this manner, the metal material, which has remained unmelted in the vicinity of the tapping hole, that is, the protruding portion, can be efficiently melted.

Further, the unmelted metal material also generates in the vicinity of the slag door over a range of less than 60° from an end of the slag door on a side of a duct collection hole toward the dust collection hole in many cases, and thus the holding position, which is set close to the slag door, is desirably set in such a position that an extension line of a line connecting a rotational center of a furnace shell to any one of electrodes passes through a region of less than 60° from the end of the opening of the slag door on the side of a duct collection hole toward the dust collection hole.

On the other hand, in the latter case (spout tapping electric arc furnace), both the tapping hole and the slag door are in substantially the same situations as that of the slag door in the EBT furnace, and thus, the holding position, which is set close to the tapping hole or the slag door, is desirably set in such a position that an extension line of a line connecting a rotational center of a furnace shell to any one of electrodes passes through a region of less than 60° from an end of a tapping hole or a slag door on a side of a dust collection hole toward the dust collection hole.

In the rotating step of the present invention, a furnace shell may be rotated from an original position relative to electrodes until any one of the electrodes reaches the above-described holding position, stopped its rotation, and held at the holding position, and thereafter, the furnace shell may be held at the holding position up to a final stage of melting, that is, until all of the metal material is completely melted. Alternatively, after held for a predetermined time at the holding position, the furnace shell may be further rotated relative to the electrodes until a center region at a cold spot reaches a center or substantially the center of a hot spot to completely melt the unmelted residue of the metal material positioned at the cold spot.

According to the present invention, the rotation step may be performed after the electrode bores the scrap.

In addition, the charging step may be performed multiple times.

According to the present invention, the electric arc furnace may include a tilting body that is tilted together with the furnace shell while supporting it, and the rotating apparatus may rotate the furnace shell around a vertical axis, preferably, a central axis above the tilting body.

In the case of using an electric arc furnace further including a burner provided on the furnace roof so as to face downwards in a position between the electrodes which are adjacent to each other in a circumferential direction, after a charging step of charging the metal material into the furnace shell via a charging opening, a melting operation can be performed by carrying out a rotating step of rotating the furnace shell relative to the electrodes and the burners during the melting of the metal material. By performing such a rotating step, since the heating position from the burner for the metal material can be changed in a rotational direction, the metal material over a wide range in the circumferential direction can be heated by the burner, and heating by the burners can be made more uniform. Accordingly, the metal material can be more uniformly melted, the speed of melting can be increased, and a melting operation can be shortened.

According to the present invention as described above, in an operation of an electric arc furnace in which a metal material is melted, unmelted residue can be effectively prevented from being formed in the vicinity of, in particular, a tapping hole or a slag door, and melting efficiency can be improved. Further, more uniform and high-speed melting can be achieved.

BRIEF DESCRIPTION OF THE DRAWINGS

FIG. 14A to FIG. 14F are explanation views illustrating the content of an operation method step by step in another embodiment of the present invention.

FIG. 15A to FIG. 15F are views illustrating an example of an operation method that is different from that in FIGS. 14A to 14F.

DETAILED DESCRIPTION OF THE INVENTION

Hereinafter, embodiments in which the present invention is applied to an electric arc furnace melting a metal material (herein, steel material) will be described in detail with reference to the drawings.

Figure 1:
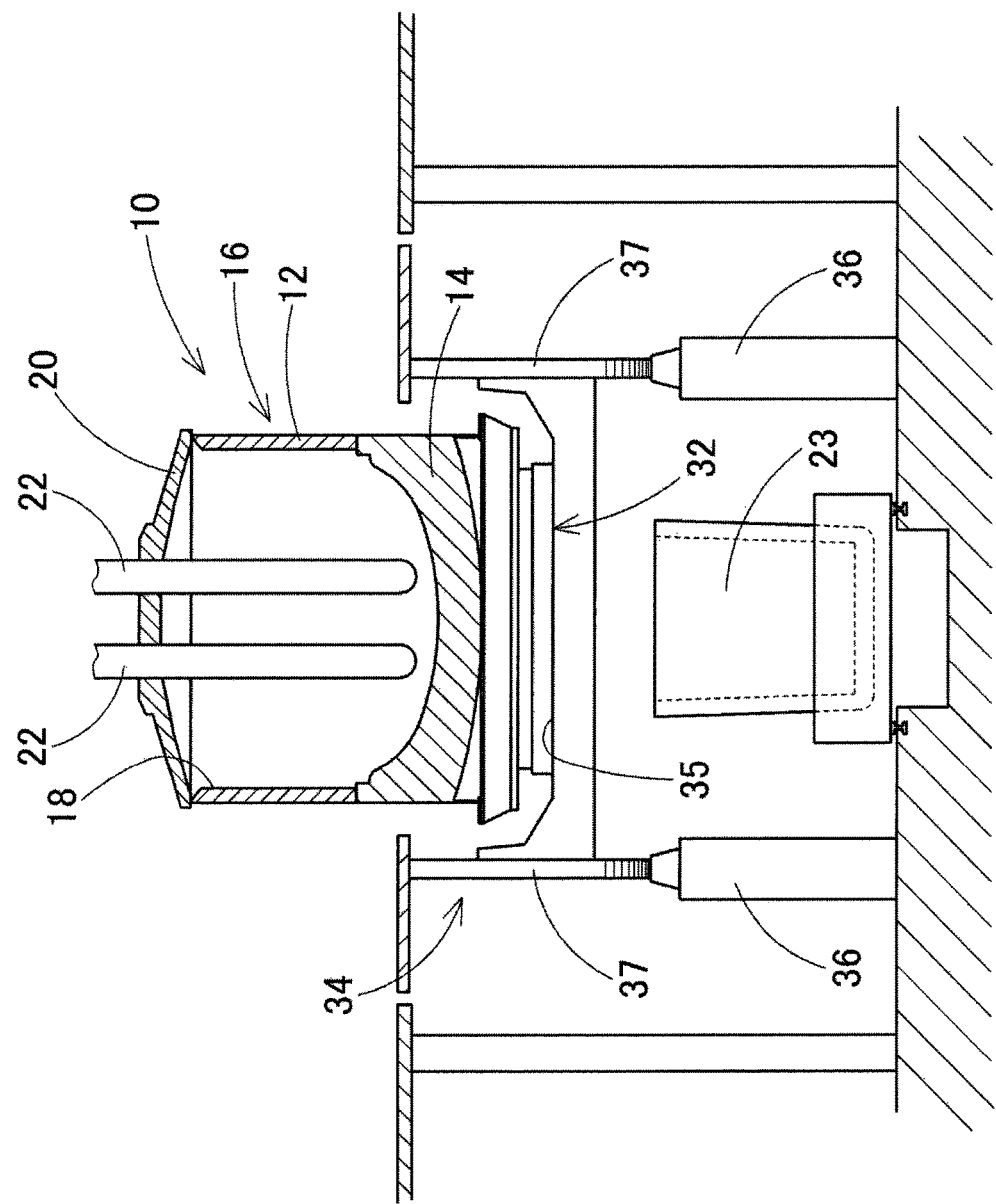
FIG. 1 is a view illustrating a configuration of an electric arc furnace that is used in an operation method in an embodiment of the present invention.
Figure 2:
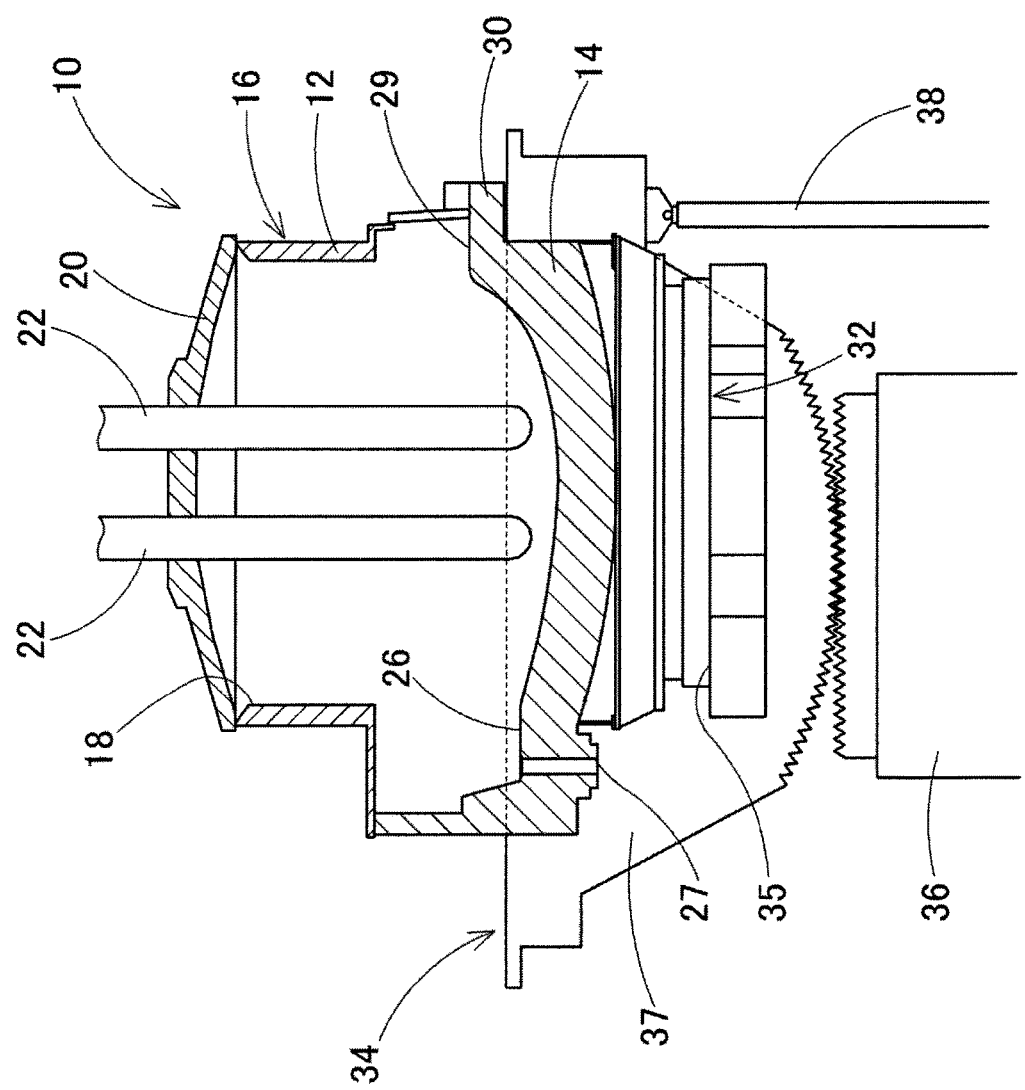
FIG. 2 is a view illustrating another cross-section of the electric arc furnace in FIG. 1.

FIG. 1 and FIG. 2 are views illustrating a configuration of the electric arc furnace that is used in an operation method in the present embodiment.

In FIG. 1, a reference numeral 10 represents an electric arc furnace, which includes a furnace shell 16 that includes a cylindrical (herein, circular cylindrical) circumferential wall portion 12, a furnace bottom portion 14 and a charging opening 18; a furnace roof 20 that openably and closably shuts the charging opening 18 at an upper end of the furnace shell 16; and three electrodes 22 which are inserted downwards into the furnace shell 16 while passing through the furnace roof 20.

Each of the electrodes 22 is disposed close to the center of the furnace roof 20 with a substantially circular shape in a plan view, while being equally spaced (at an interval of 120°) around a vertical axis, which is a center axis here, of the furnace shell 16. The electrodes 22 are supported by a lifting apparatus, which is not illustrated, in such a way that the height thereof is independently adjustable. That is, the electrodes 22 are constituted in such a way that the vertical separation distance between a lower end of the electrode 22 and a metal material charged into the furnace shell 16 is adjustable.

The furnace roof 20 is constituted as being movable in a vertical direction relative to the furnace shell 16 and being turnable in a horizontal direction by a lifting apparatus and a turning apparatus, which are not illustrated. The furnace roof 20 is capable of being moved and turned to open the charging opening 18 of the furnace shell 16 to charge a metal material into the furnace shell 16.

The electric arc furnace 10 in the present embodiment is an EBT furnace, in which a portion of the furnace bottom portion 14 protrudes outwards in a radial direction further than the circumferential wall portion 12 of the furnace shell 16 and on the protruding shelf-like protruding portion 26 is provided a tapping hole (steel tapping hole) 27 passing therethrough in the vertical direction, as illustrated in FIG. 2.

A molten metal material (molten steel) in the furnace shell 16 is tapped toward a ladle 23 (see FIG. 1) via the tapping hole 27 by tilting the entire furnace shell 16.

A slag door 29 is provided at a position (symmetrical position) that is opposite to the tapping hole 27 in the radial direction. The slag door 29 is provided so as to pass through the circumferential wall portion 12 of the furnace shell 16 in an inward and outward direction.

In the present embodiment, slag produced during a melting operation can be discharged to the outside via the slag door 29 by tilting the entire furnace shell 16 in the opposite direction from that in the case of tapping.

In the electric arc furnace 10 in the present embodiment, the furnace shell 16 is tiltable, and is rotatable relative to the furnace roof 20 and electrodes 22.

In FIG. 1, a reference numeral 34 is a tilting body that tilts while supporting the furnace shell 16 to make the furnace shell 16 tilt. The tilting body is tiltably supported by a furnace stand 36 that is provided on the ground.

Engaging teeth are provided on an upper surface of the furnace stand 36 that supports the tilting body 34, and on a lower surface of a leg portion 37, which has a convex shape toward downwards, of the tilting body 34 being in contact therewith. Due to engagement between the engaging teeth with each other, the tilting body 34 is prevented from deviating relative to the furnace stand 36 during a tilting operation.

The tilting body 34 includes a tilting bed 35 for supporting the furnace shell 16, and the furnace shell 16 is supported by the tilting bed 35 of the tilting body 34 via the rotating apparatus 32 described later.

In the present invention, the rotating apparatus may be configured as below.

That is, the rotating apparatus may be configured to include 1) a support unit that rotatably supports a furnace shell above a tilting body; 2) a guide rail that is provided between the furnace shell and the tilting body, and guides the furnace shell to rotate around a center axis thereof; 3) a driven unit that is provided on a furnace shell side, and receives rotation drive force; 4) a drive member that is provided on a tilting body side, and is engaged with the driven unit to transmit rotation drive force to the driven unit; and 5) a drive source that is provided on the tilting body side, and produces drive force. The rotating apparatus may be provided to tilt integrally with the tilting body.

In the present embodiment, the rotating apparatus is specifically configured as below.

First, a tilting mechanism will be described.

As illustrated in FIG. 2, one end of a drive cylinder 38 is rotatably connected to a right end in the drawing of the tilting body 34, and the other end of the drive cylinder 38 is rotatably connected to the ground side. When the drive cylinder 38 extends, the tilting body 34 is tilted along with the furnace shell 16 so that a left side in the drawing is moved downwards and a right side is moved upwards. As a result, molten steel in the furnace shell 16 is tapped toward the ladle 23 via the tapping hole 27.

Figure 3:
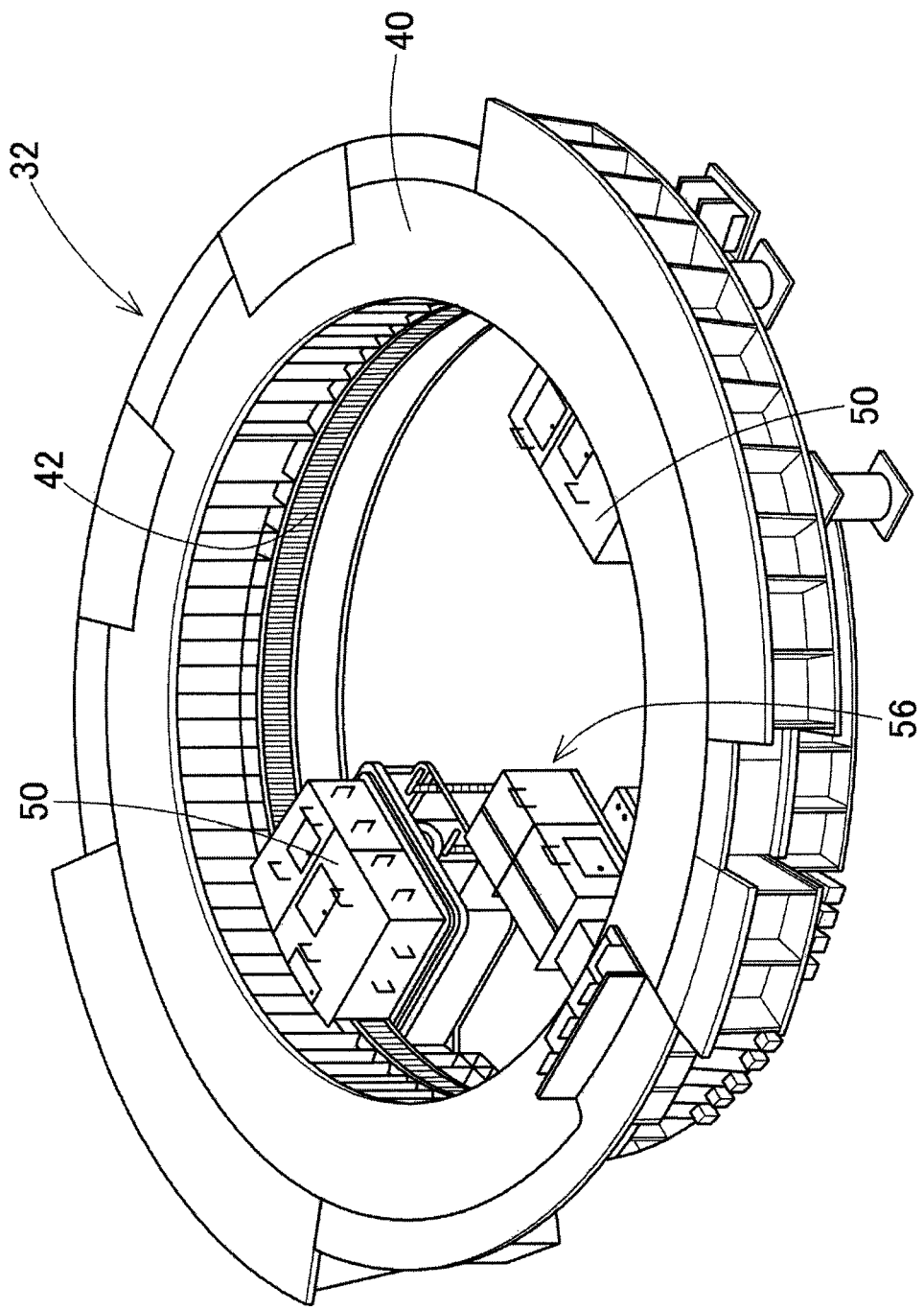
FIG. 3 is an entire perspective view of a rotating apparatus in FIG. 1.
Figure 4:
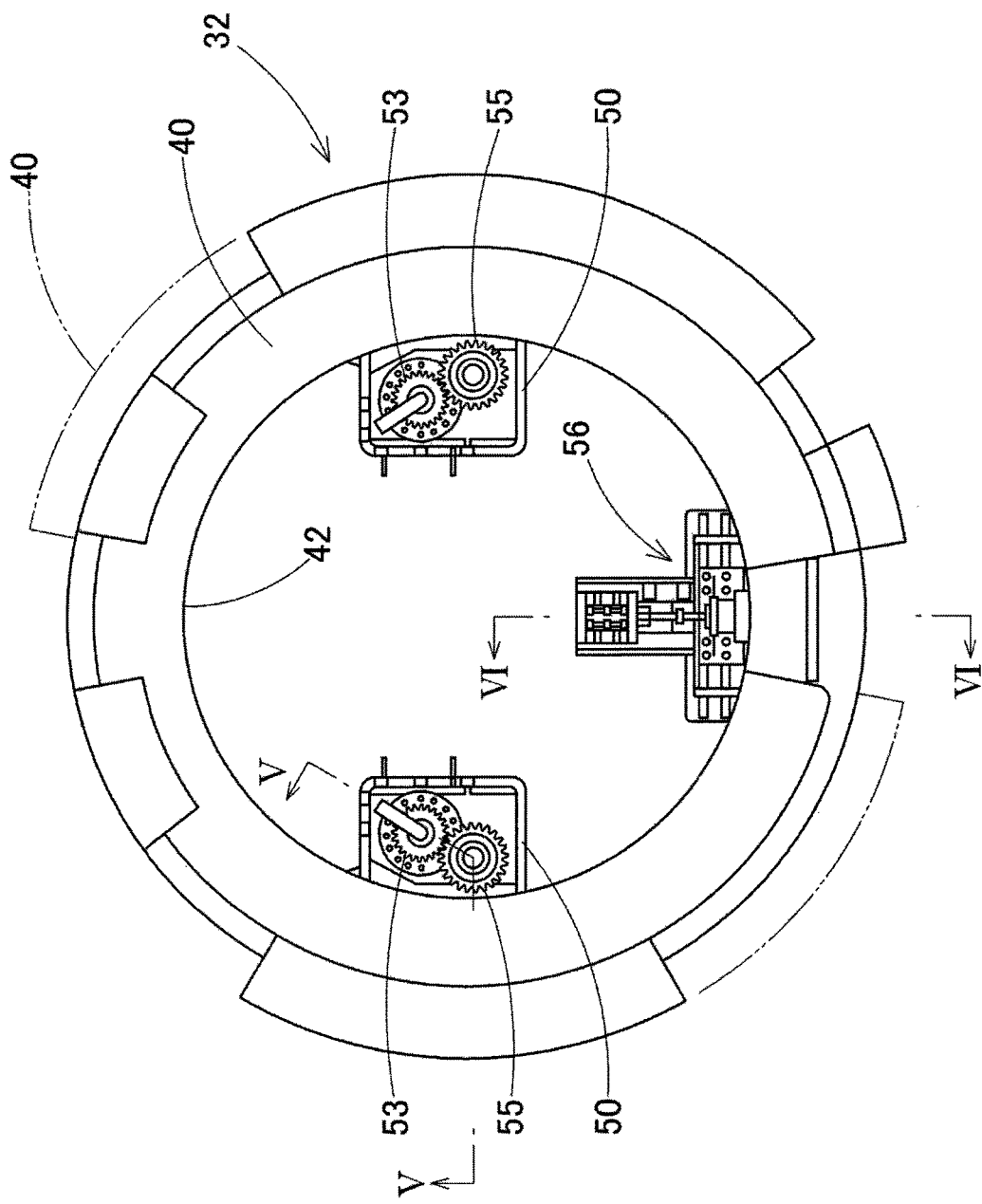
FIG. 4 is an entire plan view of the rotating apparatus.

FIG. 3 illustrates an entire perspective view of the rotating apparatus 32 in the present embodiment, and FIG. 4 illustrates a plan view thereof.

The rotating apparatus 32 includes a circular ring-shaped support frame 40 with multiple upstanding walls, and the furnace shell 16 is mounted on and fixed to an upper surface of the circular ring-shaped support frame 40.

A ring-shaped gear 42 is provided on an inner circumferential portion of a lower surface of the circular ring-shaped support frame 40, and teeth are provided on an inner circumference of the ring-shaped gear 42.

Figure 5:
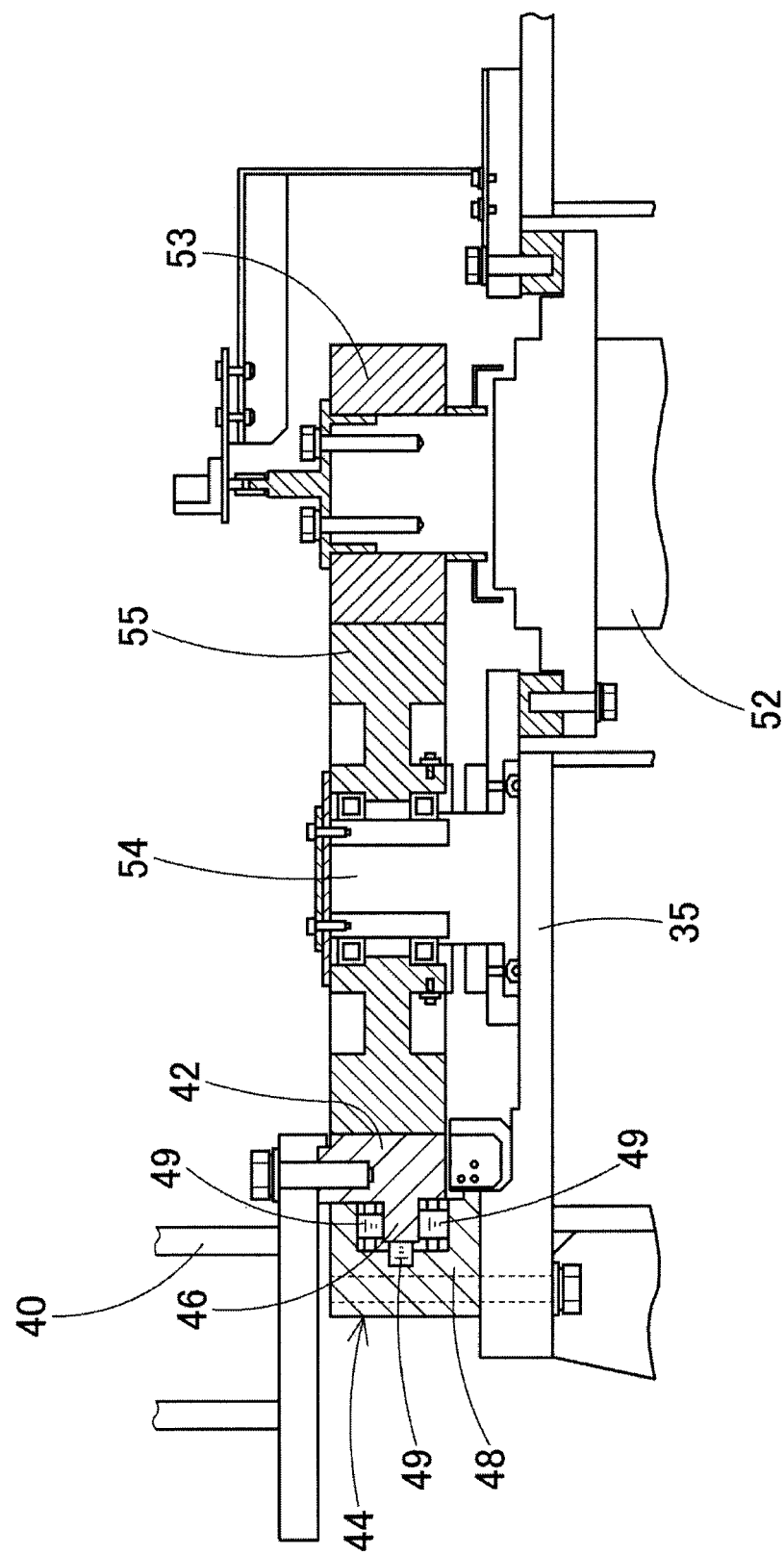
FIG. 5 is a V-V cross-sectional view in FIG. 4.

In contrast, as illustrated in FIG. 5, an outer circumferential middle portion of the ring-shaped gear 42 protrudes outwards in a square cross-sectional shape, and forms an inner race portion 46 of a bearing member 44.

An outer race portion 48 with a C-shaped cross-section is provided to surround the inner race portion 46, and roller bearings 49 are provided between a concave surface of the outer race portion 48 and a convex surface of the inner race portion 46, that is, upper and lower surfaces and an outer circumferential end surface.

Owing to such a structure, the circular ring-shaped support frame 40 is supported by the bearing member 44 and is rotatable around a ring center thereof in a plane parallel with the tilting bed 35. Accordingly, the furnace shell 16 supported by the rotating apparatus 32 is rotatable relative to the electrodes 22 around a center axis of the furnace shell 16 as a rotational center.

Gear boxes 50 (see FIG. 4) are provided on the tilting bed 35 at radially symmetrical positions inside the ring of the circular ring-shaped support frame 40, and thereinside are provided gears. In FIG. 5, a hydraulic motor 52 is provided as a drive source on the tilting bed 35 side, and on an output shaft thereof is mounted a gear 53. The gear 53 meshes with a gear 55 that is rotatably supported by a shaft 54 vertically arranged on the tilting bed 35, and the gear 55 meshes with the teeth of the ring-shaped gear 42.

Accordingly, when the hydraulic motor 52 is made rotate in a clockwise direction or a counter-clockwise direction, the circular ring-shaped support frame 40 is also rotated in the clockwise direction or the counter-clockwise direction via the gears 53, 55, and 42.

In the present embodiment, the circular ring-shaped support frame 40, the gear 42, and the bearing member 44 serve as the support unit, and the inner race portion 46 and the outer race portion 48 of the bearing member 44 among them also serve as the guide rail.

The teeth of the gear 42 serves as the driven unit, the gears 55 and 53 serve as the drive unit, and the hydraulic motor 52 serves as the drive source.

In the present embodiment, the circular ring-shaped support frame 40, that is, the furnace shell 16 can be rotated by the hydraulic motor 52, in a range of 60° in the counter-clockwise direction from an original position at which the tapping hole 27 of the furnace shell 16 faces a tapping yard as illustrated in FIG. 4.

Figure 6:
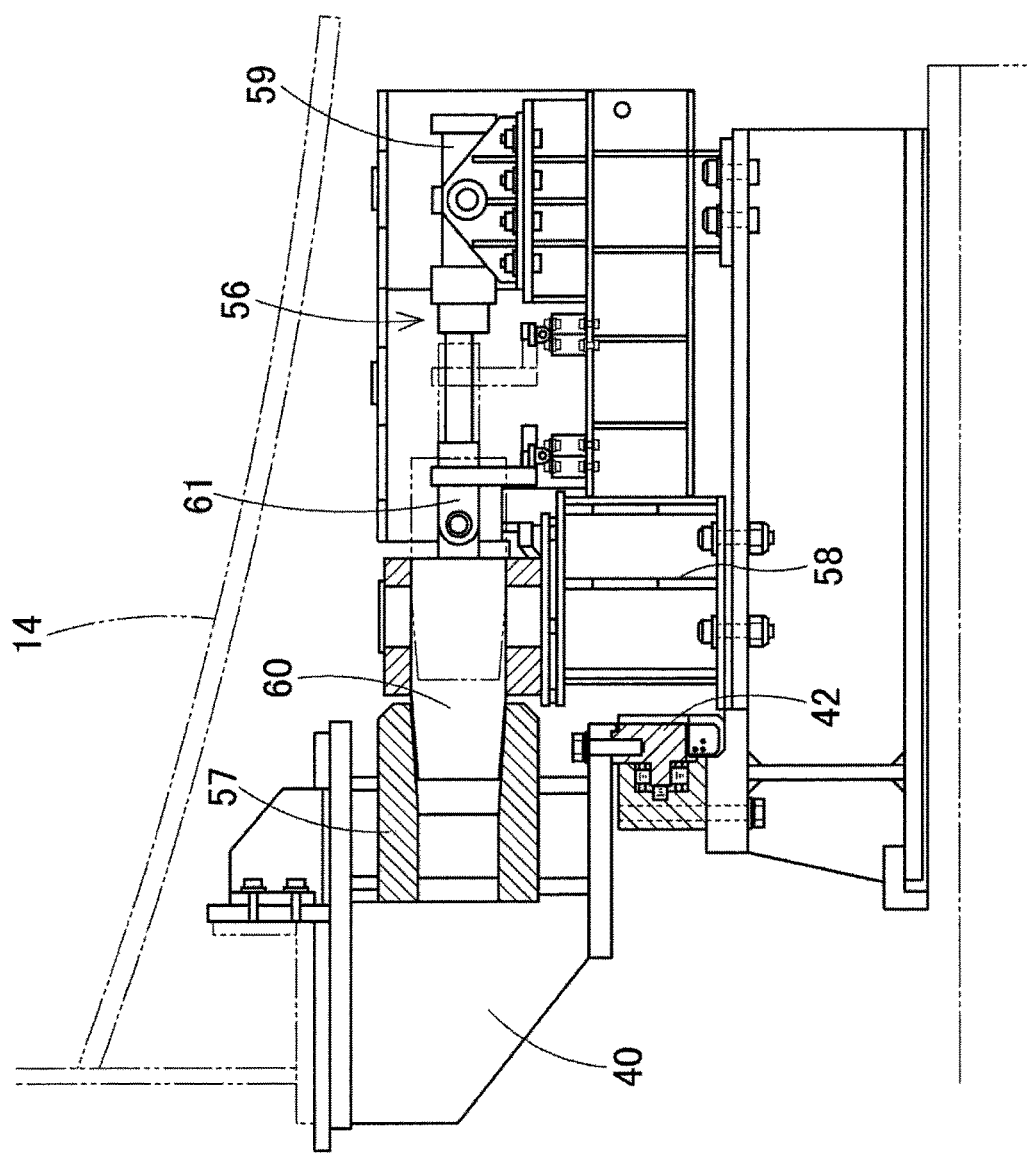
FIG. 6 is a VI-VI cross-sectional view in FIG. 4.

A stopper mechanism 56 is provided at a middle position in a circumferential direction of the circular ring-shaped support frame 40 between both of the gear boxes 50. The details of the stopper mechanism 56 are illustrated in FIG. 6. In FIG. 6, a sheath member 57 is provided inwards in the circular ring-shaped support frame 40. The sheath member 57 is a circular cylindrical body, an inner side half of which is made in a tapered shape in which the inner circumference gradually increases inwards.

In contrast, on a stand 58 of the tilting bed 35 side is provided a plug member 60, which is straightly moved forwards and backwards in an inward and outward direction by a drive cylinder 59. The plug member 60 is a circular columnar body, a tip end portion of which positioned on the outside side has a diameter gradually decreasing toward the tip end, and a rear end of the plug member 60 is connected to a rod 61 of the drive cylinder 59.

When the circular ring-shaped support frame 40 is at the original position, as illustrated in FIG. 6, the sheath member 57 faces the plug member 60, and when the plug member 60 is made move forwards by the drive cylinder 59, the plug member 60 enters the sheath member 57 and the tapered tip end portion of the plug member 60 is fitted into the tapered half portion of the sheath member 57. Accordingly, rotation of the circular ring-shaped support frame 40, that is, the furnace shell 16 is reliably restricted, and in this state, the furnace shell 16 can be tilted for tapping or tilted for discharging slag.

Next, a method of operating the electric arc furnace 10 to melt a metal material will be described with reference to FIG. 7A to FIG. 7F.

Typically, a metal material such as scrap is charged into a furnace in multiple times. In this example, the metal material is charged into the furnace in twice.

First, the charging opening 18 of the furnace shell 16 is opened by turning and withdrawing the furnace roof 20, a scrap bucket containing the metal material is moved to a position above the charging opening 18 by a crane, and the metal material in the scrap bucket is charged into the furnace.

Figure 7A:
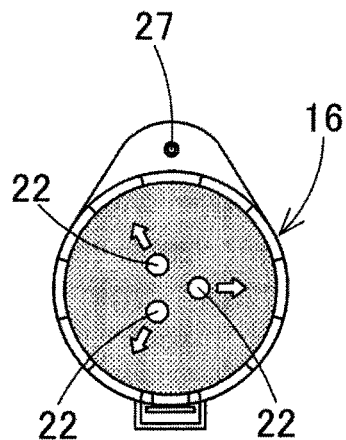
FIG. 7A to FIG. 7F are explanation views illustrating each step of an example of the operation method.

After the completion of the charging of the metal material, the furnace roof 20 and the electrodes 22 are placed above the furnace shell 16, and arcs are produced from the tip ends of the electrodes 22 downward to preferentially melt the metal material positioned around the tip end portions of the electrodes 22. The electrodes 22 are made bore into the metal material (this step is referred to as a boring step hereinafter). FIG. 7A illustrates a state in which the boring is performed.

Figure 7B:
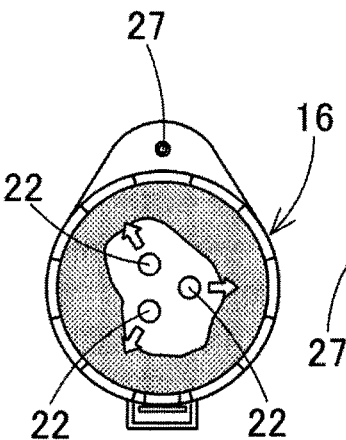

When the boring is completed and the electrodes 22 reach the vicinity of a furnace bottom portion 14, the material around the electrodes 22 is melted (FIG. 7B).

When unmelted metal material around the electrodes 22 is disappeared as a result, the furnace shell 16 becomes rotatable relative to the electrodes 22. Portions in the furnace illustrated by half-tone dots in the drawing represent the unmelted metal material, and portions illustrated by white backgrounds represent the molten metal material. In this stage, extremely ununiform melting has not occurred yet.

Figure 7C:
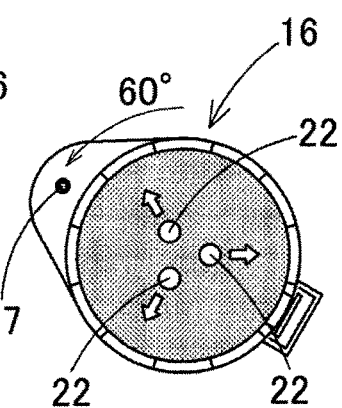
Figure 7D:
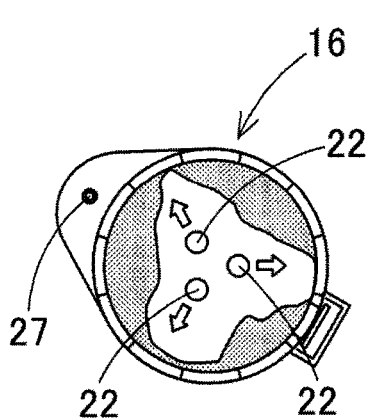

After the melting proceeds and the volume of unmelted metal material in the furnace is reduced, the remainder of the metal material is additionally charged. The furnace roof 20 is turned and withdrawn, the furnace shell 16 is rotated by 60° from the original position in the counter-clockwise direction in the drawing, and thereafter, the metal material is additionally charged (FIG. 7C). Thereafter, the furnace roof 20 and the electrodes 22 are placed above the furnace shell 16, and the melting of the metal material is performed again by arc discharge including the boring step, then, the metal material is ununiformly melted by forming three hot spots and three cold spots in the circumferential direction of the furnace shell 16 (FIG. 7D).

Figure 7E:
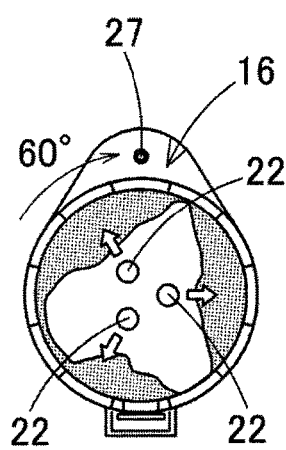
Figure 7F:
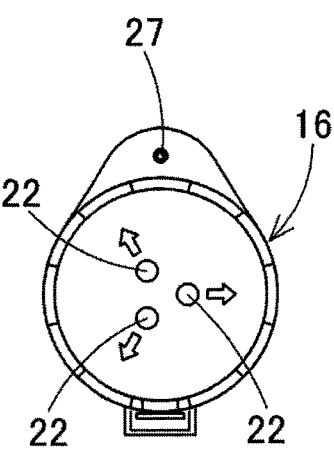

Then the unmelted metal material is moved to the hot spot by rotating the furnace shell 16 by 60° in the clockwise direction in the drawing to the original position, in a state where the furnace roof 20 is separated upwards (FIG. 7E). In this state, the furnace roof 20 is closed and the discharge from the electrodes 22 is started, whereby the unmelted metal material can be effectively heated by the electrodes 22. As illustrated in FIG. 7F, the melting of the metal material charged into the furnace is completed.

However, in an operation of merely switching hot spots and cold spots by rotating the furnace shell and the electrodes relative to each other according to the above operation method, the metal material in the vicinity of the tapping hole 27 is positioned distantly from the electrodes 22 and is difficult to be satisfactorily melted.

In the present embodiment, as illustrated in FIGS. 8A and 8B and FIG. 9A to 9H, a holding position is set to a position relative to the tapping hole 27, the rotation of the furnace shell 16 is stopped when any one of the electrodes reaches the holding position, and in a state of keeping the electrode at the holding position, the heating by arc discharge from the electrodes 22 is performed, whereby, the metal material in the vicinity of the tapping hole 27 can be melted.

Figure 8A:
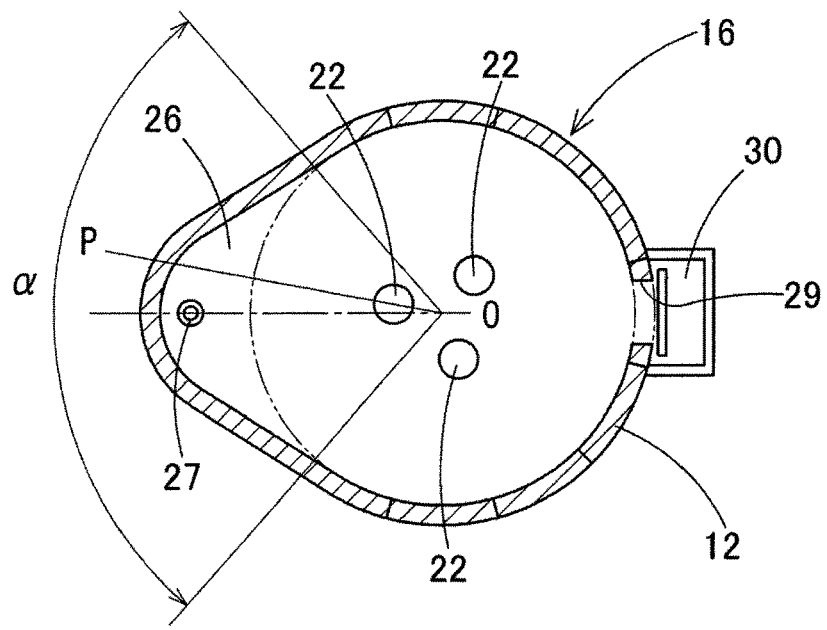
FIG. 8A and FIG. 8B are views explaining the holding positions in an EBT furnace.

FIG. 8A illustrates a holding position set relative to the tapping hole 27 in the case where the electric arc furnace is an EBT furnace.

The holding position is desirably set as such a position that an extension line OP of a line connecting a rotational center O of the furnace shell to any electrode (electrode that is closest to the tapping hole 27 in the drawing) of a plurality of the electrodes 22 passes through between one end and the other end of the protruding portion (tapping-hole bottom portion) 26 in a circumferential direction in the vicinity of the tapping hole 27. Typically, an angle range α is approximately 100°.

By setting the holding position in this manner, the electrode 22 can be positioned close to the metal material in the vicinity of the tapping hole 27, and the metal material in the vicinity of the tapping hole 27 can be effectively heated.

Further preferable is that the angle formed by the extension line OP and the line connecting the rotational center O of the furnace shell to a center of the tapping hole 27 is less than α/4 (approximately less than 25°) and more desirably less than α/6 (approximately less than 17°).

By this manner, the metal material which positions on the outside in the radial direction and positions in a region proximate to the tapping hole 27 that is particularly separated from the electrodes can be effectively heated.

FIGS. 9A to 9H illustrate an example of an operation method of setting a holding position relative to the tapping hole 27 and performing a heating by the electrodes at the holding position.

In this example, steps illustrated in FIGS. 9A to 9D are the same as steps of FIGS. 7A to 7D.

Figure 9A:
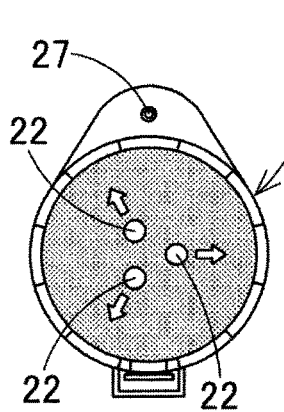
FIG. 9A to FIG. 9H are explanation views illustrating an example of an operation method that is different from that in FIGS. 7A to 7F.
Figure 9B:
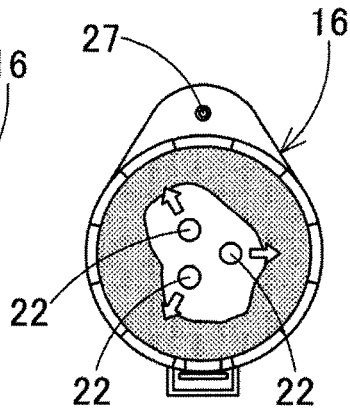
Figure 9C:
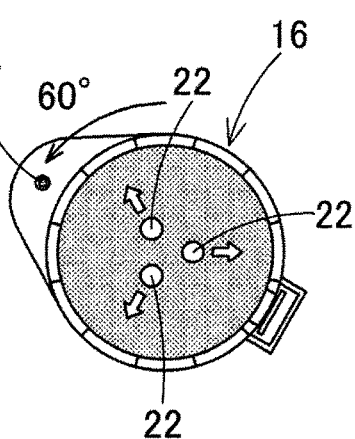
Figure 9D:
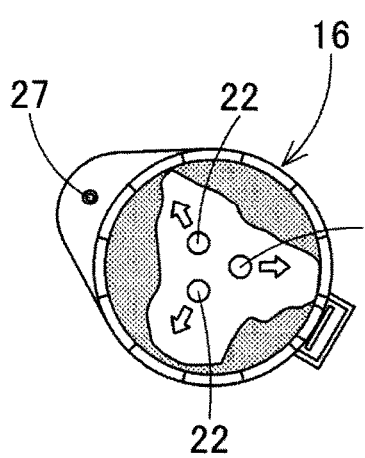
Figure 9E:
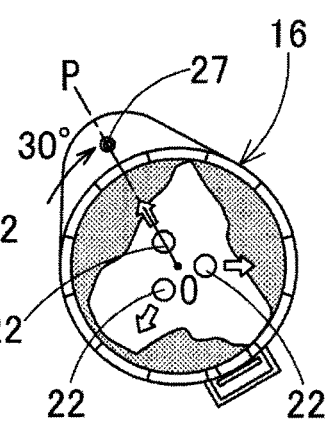

In this example, the furnace shell 16 is not directly rotated up to the original position by rotating by 60° from a state of FIG. 9D, and instead, as illustrated in FIG. 9E, the furnace shell 16 is rotated by 30° in the clockwise direction in the drawing from the state of FIG. 9D, and then the rotation is stopped at a position in which the furnace shell 16 rotates from the original position by 30° in the counter-clockwise direction.

This state illustrated in FIG. 9E represents a state in which the electrode 22 positioned closest to the tapping hole 27 reaches the holding position that is set relative to the tapping hole 27 in this example. In this example, the holding position is set as a position that the extension line OP of the line connecting the rotational center of the furnace shell 16 to the electrode 22 positioned closest to the tapping hole 27 passes through the tapping hole 27.

Figure 9F:
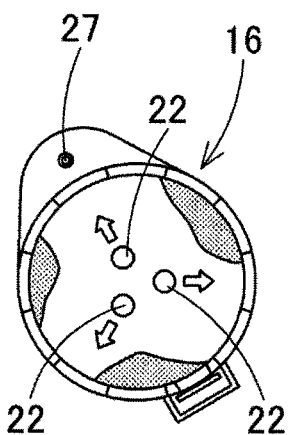
Figure 9G:
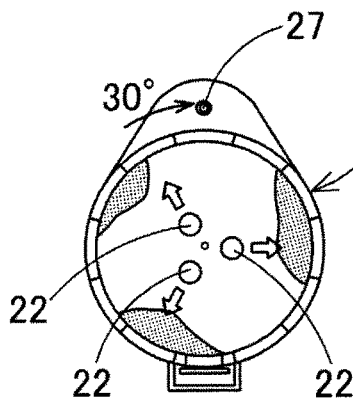

By performing arc discharge from the electrodes 22 in a state where the electrode 22 is held at the holding position, the metal material in the vicinity of the tapping hole 27 can be effectively heated (FIG. 9F).

Figure 9H:
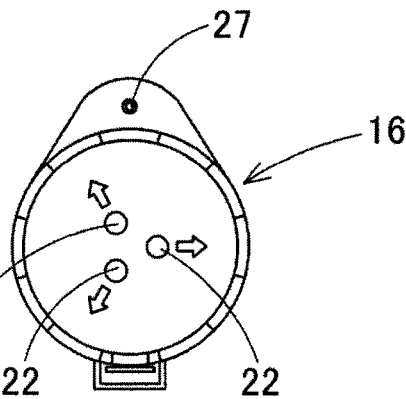

In this example, after the metal material in the vicinity of the tapping hole 27 is heated by arc discharge in a state where the electrode 22 is kept at the holding position, the furnace shell 16 is rotated to the original position in a state where the furnace roof 20 is separated upwards (FIG. 9G), and the melting of unmelted metal material remaining on an inner surface of the circumferential wall portion 12 is promoted. Finally, as illustrated in FIG. 9H, the melting of the metal material charged into the furnace is completed.

That is, by adding the steps of FIGS. 9E and 9F to the example illustrated in FIGS. 7A to 7F, in the example of the operation illustrated in FIGS. 9A to 9H, the formation of unmelted residue in the vicinity of the tapping hole 27 can be effectively prevented.

Figure 10A:
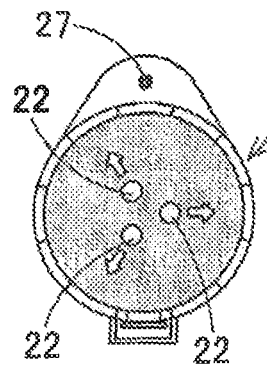
FIG. 10A to FIG. 10G are explanation views illustrating an example of an operation method that is different from those in FIGS. 7A to 7F and FIGS. 9A to 9H.
Figure 10B:
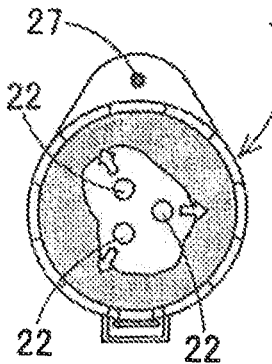
Figure 10C:
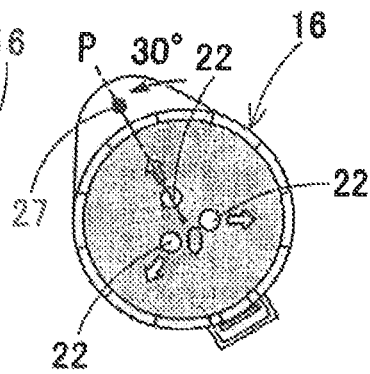
Figure 10D:
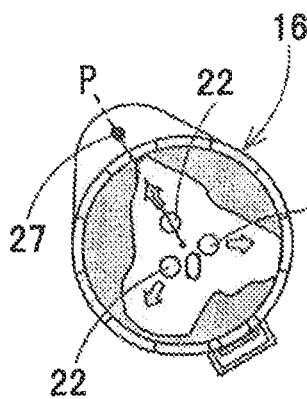
Figure 10E:
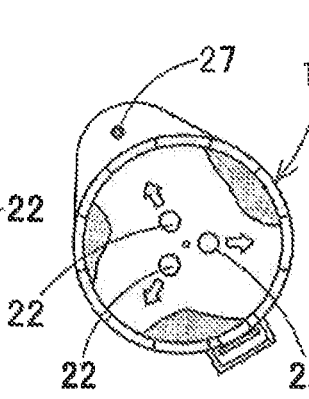
Figure 10F:
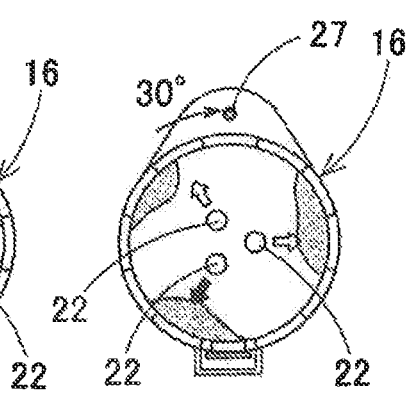

In the above-described examples of FIGS. 7A to 7F and FIGS. 9A to 9H, after rotated by 60° at the time of the additional charging, the furnace shell 16 is rotated again until the electrode 22 positioned close to the tapping hole 27 reaches the holding position set relative to the tapping hole 27. However, as in the example illustrated in FIGS. 10A to 10G, the furnace shell 16 may be rotated to reach the holding position set relative to the tapping hole 27 from the start at the time of the additional charging in FIG. 10C, the metal material may be heated at the holding position, thereby making the metal material in the vicinity of the tapping hole 27 be melted after the charging of the metal material.

Figure 10G:
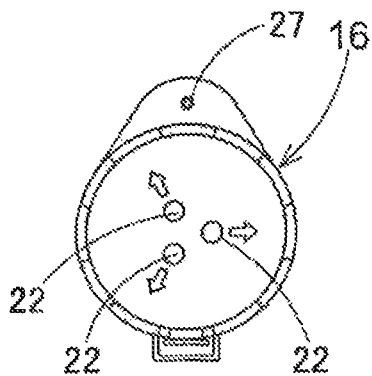

In this example, thereafter, the furnace shell 16 is rotated up to the original position (FIG. 10F), unmelted metal material remaining on the inner surface of the circumferential wall portion 12 is melted, and as illustrated in FIG. 10G, the melting of the metal material charged into the furnace is completed.

The above is the operation method of preventing the formation of unmelted residue in the vicinity of the tapping hole 27. For effectively heating the metal material in the vicinity of the slag door 29, after heating is performed at the holding position set relative to the tapping hole 27, the furnace shell 16 may be rotated to reach a holding position that is set relative to the slag door 29, stopped rotating, and held at the second holding position, thereby effectively heat the metal material positioned in the vicinity of the slag door 29.

Figure 8B:
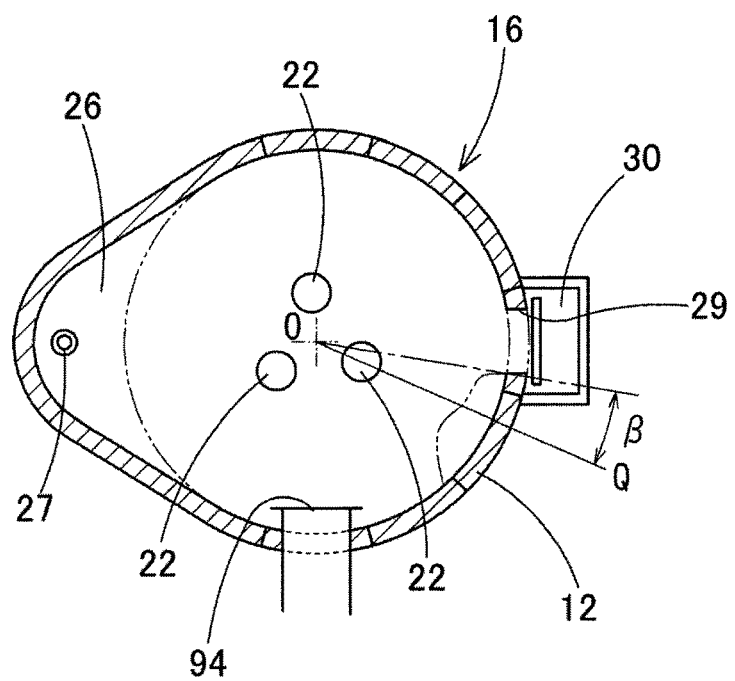

FIG. 8B illustrates a holding position set relative to the slag door 29 in the case where the electric arc furnace is an EBT furnace.

In many cases, unmelted residue in the vicinity of the slag door 29 is formed over a range of approximately 60° from an end of the slag door 29 on a side of a dust collection hole 94 toward the dust collection hole 94. Therefore the holding position relative to the slag door 29 is desirably set in such a way that an extension line OQ of a line connecting a rotational center O of a furnace shell to any electrode of the plurality of electrodes 22 is positioned in a range of an angle of less than 60° from the end of the slag door 29 on a side of the dust collection hole 94 toward the dust collection hole 94.

Since the largest amount of unmelted residue is present in many cases in a range of less than approximately 45°, and particularly, less than approximately 30° from the end of the slag door 29 on a side of the dust collection hole 94 toward the dust collection hole 94, the holding position is more desirably set in such a way that an angle β illustrated in the drawing is positioned in a range of less than 45°, and more desirably in a range of less than 30°.

By setting the holding position in this manner, the metal material which has remained unmelted in an end portion of the slag door 29 can be efficiently melted.

Figure 11A:
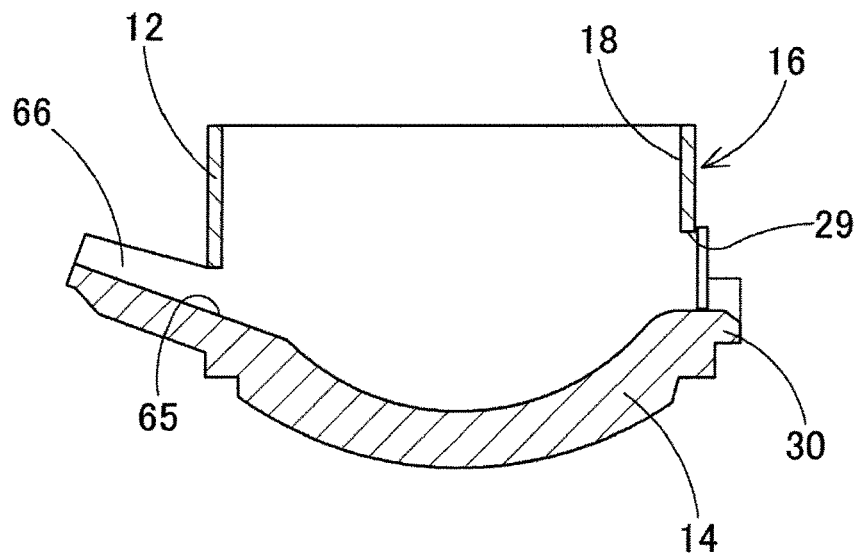
FIG. 11A and FIG. 11B are views explaining holding positions in a spout tapping electric arc furnace.
Figure 11B:
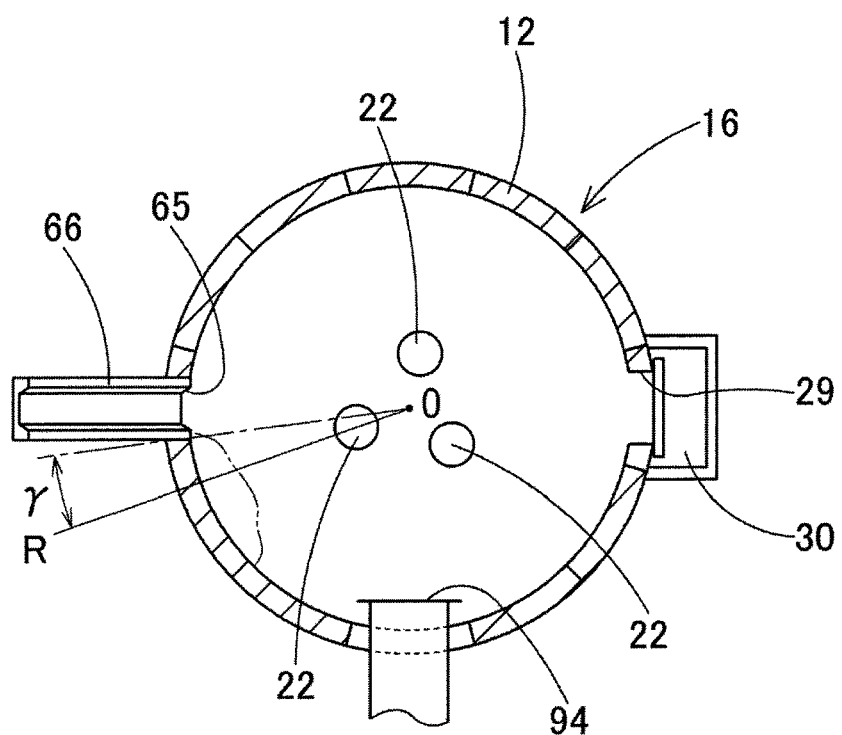
Figure 12A:
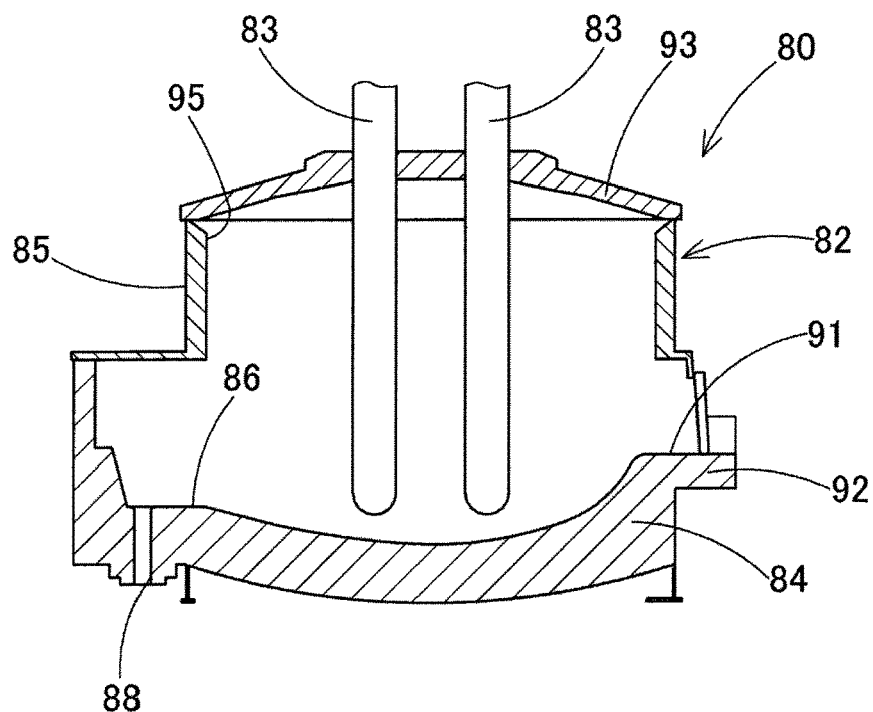
FIG. 12A and FIG. 12B are views explaining unmelted residue of a metal material in an EBT furnace.
Figure 12B:
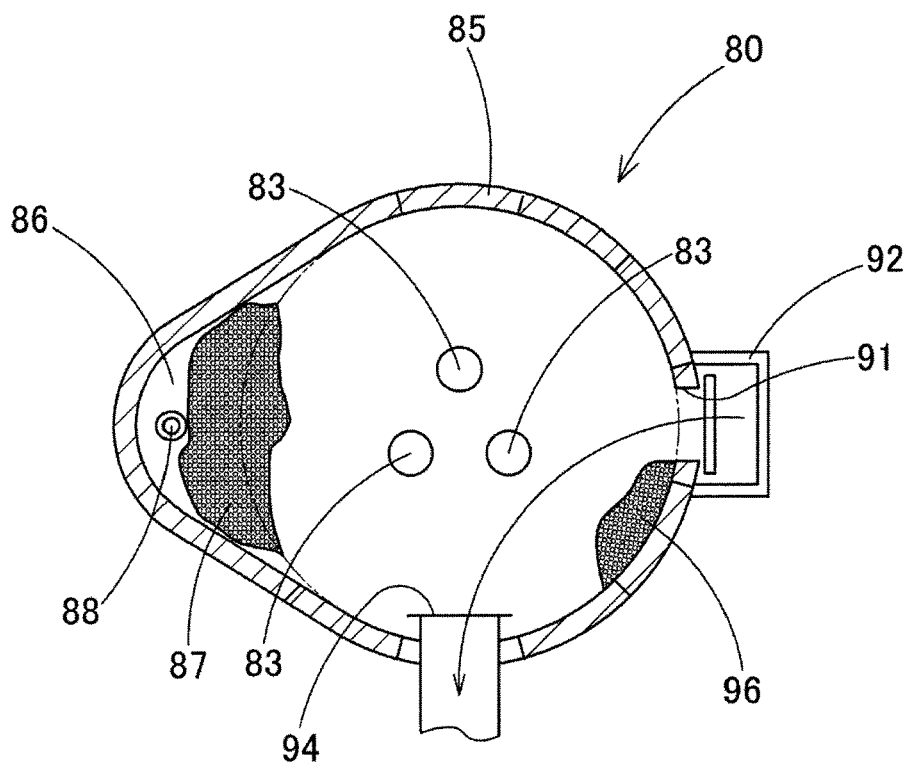

FIGS. 11A and 11B are views illustrating the configuration of a spout tapping electric arc furnace.

In this type of electric arc furnace, a tapping hole 65 is configured by an opening that passes through a circumferential wall portion 12 of a furnace shell 16 in a radial direction, and a spout 66 extends from the tapping hole 65.

In the spout tapping electric arc furnace, the tapping hole 65 is kept in an open state during a melting operation, and thus external air infiltrates into the furnace therethrough, flow of cool air is generated in the furnace from the tapping hole 65 toward the dust collection hole 94 attached to the furnace roof, the metal material inside the furnace is cooled in the vicinity of the end portion of the tapping hole 65 on a side of the dust collection hole 94, and thus unmelted residue is formed. That is, the vicinity of the tapping hole 65 is in substantially the same state as that of the slag door of the EBT furnace.

For this reason, in the case of the spout tapping electric arc furnace, the holding position set relative to the tapping hole 65 is desirably set in such a way that the extension line OR of the line connecting the rotational center O of the furnace shell 16 to an electrode positioned closest to the tapping hole 65 of the plurality of electrodes 22 is positioned in the range of an angle of less than 60° from an end of the tapping hole 65 on the side of the dust collection hole 94 toward the dust collection hole 94.

Further preferred is to set an angle γ in the drawing in a range of less than 45°, and more desirably, in a range of less than 30°.

By setting the holding position in this manner, the metal material positioned in the vicinity of the end portion of the tapping hole 65 can be efficiently melted.

In the spout tapping electric arc furnace, the slag door has the same structure as that in the EBT furnace, and the holding position set relative to the slag door is desirably set so as to be in the same range as in the case of the EBT furnace.

The embodiments of the present invention have been described above in details but they are merely examples. In the present invention, for example, a holding step may be performed independent from the method of switching hot spots and cold spots.

Further, the electrodes may be rotated instead of the furnace shell, and the number of electrodes may two, four, or other than those numerals.

Furthermore, it is also applicable to a method of operating an electric arc furnace that melts metal other than steel. As such, the present invention can be realized in various modified forms insofar as they do not depart from the gist thereof.

Hereinafter, modified embodiments of the present invention, other than the above-described embodiment, will be described in detail with reference to FIGS. 13A to 17B. The same or similar component as that in the above-described embodiment will be noted by the same reference numeral and the detailed description thereof will be omitted.

Figure 13A:
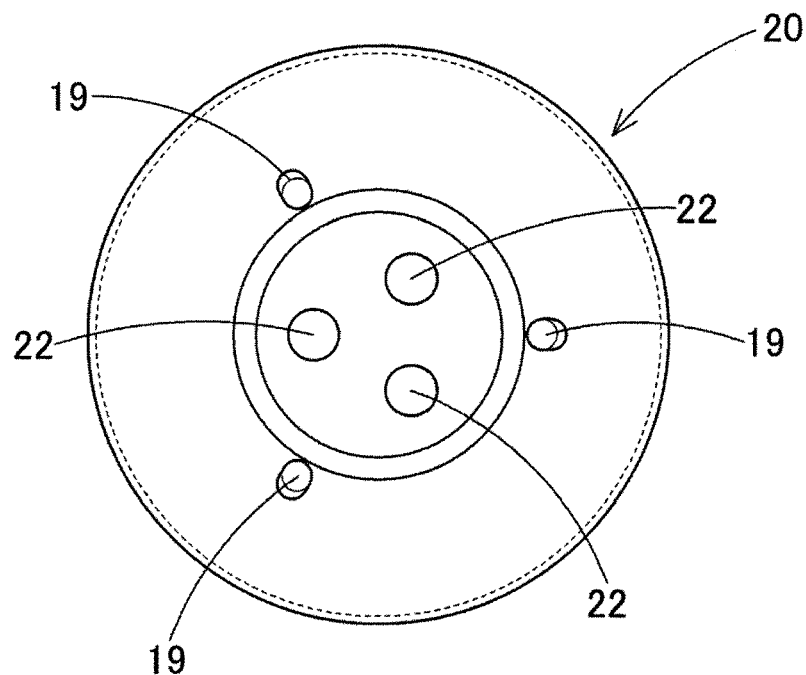
FIG. 13A and FIG. 13B are views illustrating a state in which burners are attached to an electric arc furnace that is used in another embodiment of the present invention.

In the electric arc furnace 10 in the modified embodiment, as illustrated in FIG. 13A, three burners 19 are attached to the furnace roof 20 for accelerating the melting of the metal material.

Each burner 19 is disposed between the electrode 22 and the circumferential wall portion 12 of the furnace shell 16 when the arrangement is seen in the radial direction.

When the arrangement is seen in the circumferential direction, the burners 19 are respectively provided at every position between the electrodes 22 (specifically, at every intermediate position in the circumferential direction between the adjacent electrodes 22). These three burners 19 are disposed with equally intervals (at intervals of 120°) in the circumferential direction.

Figure 13B:
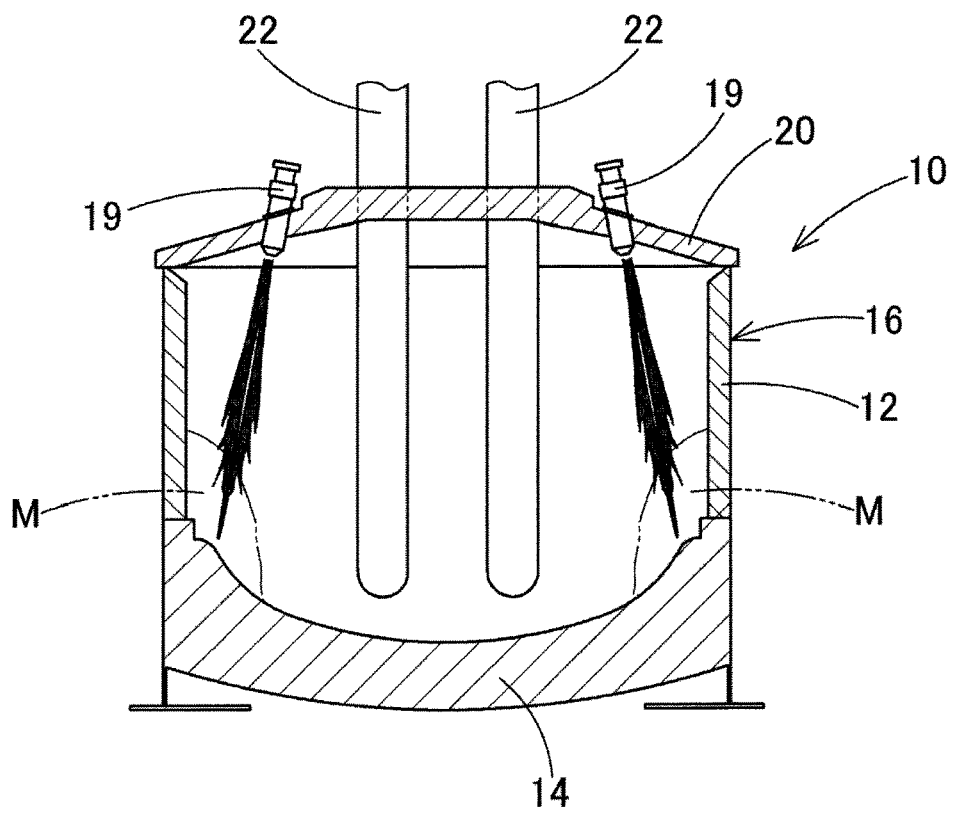

As illustrated in FIG. 13B, in order to effectively heat a metal material M that is remained unmelted on a lower side of the circumferential wall portion 12 of the furnace shell 16, the burner 19 is attached in such a way that a tip end thereof slightly faces toward the circumferential wall portion 12 rather than directly below. However, insofar as not departing from the gist of the present invention, the arrangement of the burner 19 can be properly designed. For example, the burner 19 may be disposed in such a way that the tip end thereof faces directly below.

Next, a method of operating the electric arc furnace 10 to melt a metal material will be described with reference to FIGS. 14A to 14F.

Typically, a metal material such as scrap is charged into a furnace in multiple times. In this example, the metal material is charged into the furnace in twice.

First, the charging opening 18 of the furnace shell 16 is opened by turning and withdrawing the furnace roof 20, a scrap bucket containing the metal material is moved to a position above the charging opening 18 by a crane, and the metal material in the scrap bucket is charged into the furnace.

After the completion of the charging of the metal material, the furnace roof 20 and the electrodes 22 are placed above the furnace shell 16, and arcs are produced from the tip ends of the electrodes 22 downward to preferentially melt the metal material positioned around the tip end portions of the electrodes 22. The electrodes 22 are made bore into the metal material (this step is referred to as a boring step hereinafter). FIG. 14A illustrates a state in which the boring is performed.

When the boring is completed and the electrodes 22 reach the vicinity of a furnace bottom portion 14, the material around the electrodes 22 is melted (FIG. 14B).

When unmelted metal material around the electrodes 22 is disappeared as a result, the furnace shell 16 becomes rotatable relative to the electrodes 22. Portions in the furnace illustrated by half-tone dots in the drawing represent the unmelted metal material, and portions illustrated by white backgrounds represent the molten metal material. In this stage, extremely ununiform melting has not occurred yet.

After the melting proceeds and the volume of unmelted metal material in the furnace is reduced, the remainder of the metal material is additionally charged. The furnace roof 20 is turned and withdrawn, the furnace shell 16 is rotated by 60° from the original position in the counter-clockwise direction in the drawing, and thereafter, the metal material is additionally charged (FIG. 14C). Thereafter, the furnace roof 20 and the electrodes 22 are placed above the furnace shell 16, and the melting of the metal material is performed again by arc discharge including the boring step, then, the metal material is ununiformly melted by forming three hot spots and three cold spots in the circumferential direction of the furnace shell 16 (FIG. 14D).

In the modified embodiment, the metal material between the electrodes 22 (between in the circumferential direction) is heated and melted by flames from the three burners 19 provided in the furnace roof 20 at the same time of heated and melted by the electrodes 22.

For example, in a state illustrated in FIG. 14D, the metal material at the cold spot between the electrodes 22 is heated and melted.

After the heating of FIG. 14D, the furnace shell 16 is rotated to the original position by 60° in the clockwise direction in the drawing in a state where the furnace roof 20 is separated upwards, to thereby relatively move the metal material at a hot spot to a cold spot and the metal material at a cold spot to a hot spot. The furnace shell 16 is held at the original position, the furnace roof 20 is closed and heating by the electrode 22 and heating by the burner 19 are performed. Specifically, the metal material, the position of which is changed from a cold spot to a hot spot, is heated and melted by the electrode 22 and the metal material, the position of which is changed from a hot spot to a cold spot, is heated and melted by the burner 19.

In this case, since the metal material, the position of which is changed from a cold spot to a hot spot, has been applied a heating and melting action by the burner 19 at the position of the original cold spot, the amount of unmelted material is small as compared to the case of a melting operation by a conventional electric arc furnace with a rotating apparatus 32. Therefore, the heating and melting by the electrodes 22 can be rapidly completed.

In contrast, as for the metal material, which has been newly reached to a cold spot from a hot spot, even if an unmelted metal material remains there, this can be rapidly heated and melted by the burner 19.

In the present embodiment, depending on the circumstances, during the furnace shell 16 is rotated by 60° in the clockwise direction in the drawing to the original position from the state of FIG. 14D, that is, during the electrodes 22 and the burners 19 are rotated relative to the metal material in the furnace shell 16, the metal material can be heated and melted by the electrodes 22 and the burners 19 while the furnace shell 16 is continuously rotated.

In particular in this case, the heating position by the electrodes 22 and the burners 19 to the metal material can be continuously changed, and the heating action can be applied over a wide range of the metal material. In this case, the holding step in the above-described embodiment can be omitted. Further, this operation method of the modified embodiment is applicable to an electric arc furnace without tapping hole and slag door.

The example of the operation illustrated in FIGS. 14A to 14F is an example in which the burners are used after the metal material is additionally charged; however, in the modified embodiment, as illustrated in FIGS. 15A to 15F, the metal material can be heated and melted by the electrodes 22 and the burners 19 from an initial charging stage (refer to FIG. 15A) at which melting is started.

As described above, according to the modified embodiment, by rotating the furnace shell 16 relative to the electrodes 22 provided in the furnace roof 20 by the rotating apparatus 32, a portion at a cold spot can be moved to a hot spot, and a portion at a hot spot can be moved to a cold spot, whereby the metal material in the furnace shell can be more uniformly heated.

Furthermore, in the modified embodiment, since the burners 19 is provided on the furnace roof 20 so as to face downwards in a position between the electrodes 22 in a circumferential direction, the metal material in the furnace shell can be heated also at a position between the electrodes 22 (between the electrodes 22 in the circumferential direction) by the burners.

Further, in the modified embodiment, since the heating position from the burners to the metal material can be changed by the rotation by the rotating apparatus 32, the metal material can be heated by the burners 19 over a wide range in the circumferential direction and the heating from the burners 19 can be made more uniform.

In the modified embodiment, the metal material can be uniformly heated, and in addition, the speed of heating can be increased as compared to that in the conventional art, time required to melt the metal material can be further reduced, and high-speed melting can be realized.

In the modified embodiment, the burners 19 are disposed in a position between the electrodes 22 and the circumferential wall portion 12 of the furnace shell in the radial direction of the furnace roof 20. Therefore, the unmelted metal material, which is positioned distant from the electrode 22 and positioned close to the circumferential wall portion 12, can be heated by the burner 19 from a position closer than the electrode 22. Therefore, heating efficiency can be further improved and time required for a melting operation can be further reduced.

For example, in the holding step of the above-described embodiment, the furnace shell 16 may be rotated until the any one of the burners 19, instead of the electrodes 22, reaches the holding position that is set close to tapping hole or slag door and held at the state.

Figure 16:
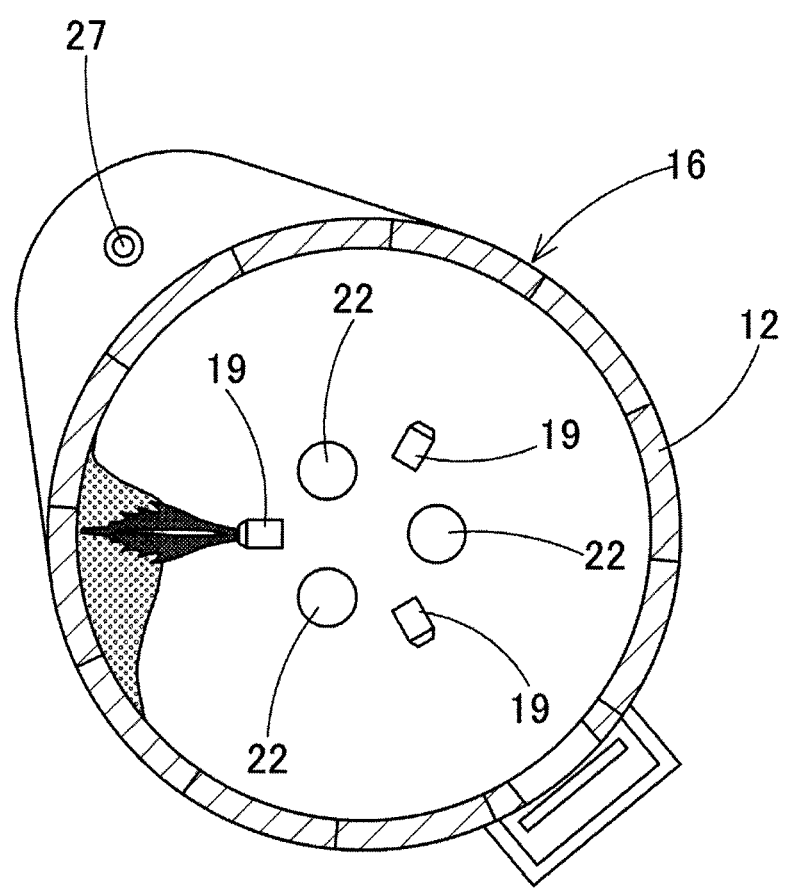
FIG. 16 is a view illustrating an example of an operation method that is different from those in FIGS. 14A to 14F and FIGS. 15A to 15F.
Figure 17A:
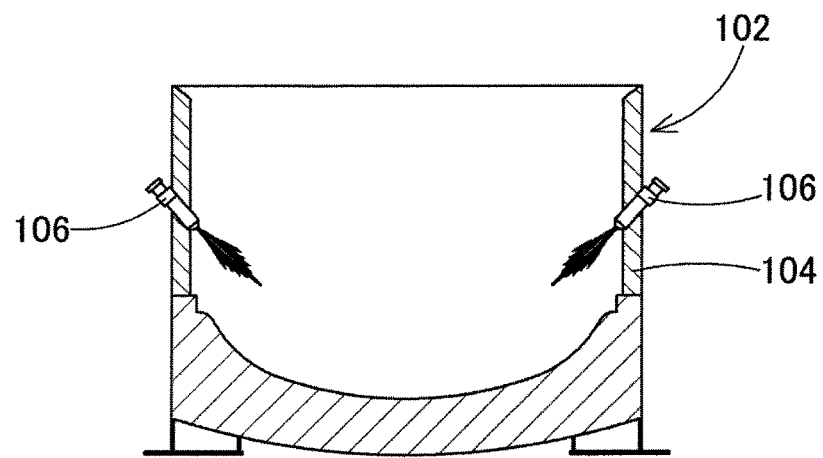
FIG. 17A to FIG. 17C are views explaining a problem of a conventional electric arc furnace.
Figure 17B:
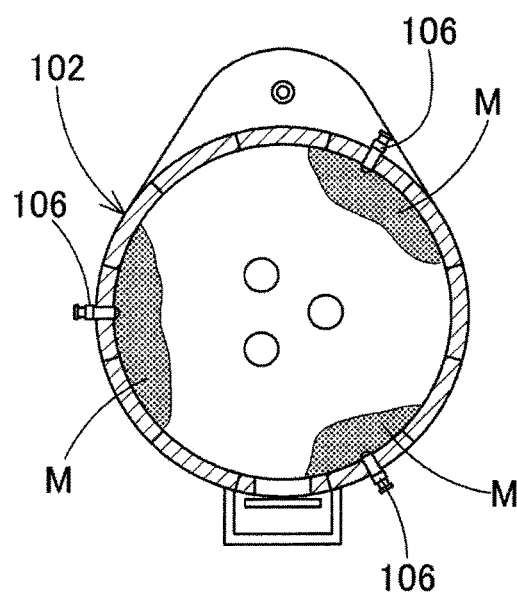
Figure 17C:
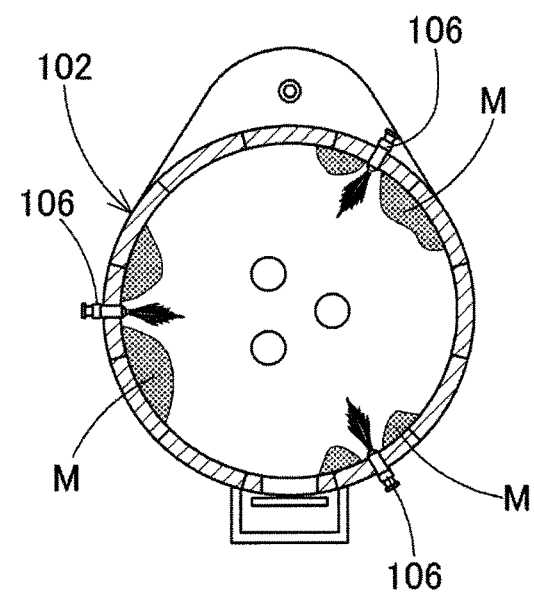

In the operation method in the modified embodiment, flames emanate from the three burners 19 at the same time; however, when metal remains unmelted at one location inside the furnace as illustrated in FIG. 16, the furnace shell 16 may be rotated up to a position at which flame can emanate from any one of the burners 19 directly to the unmelted metal material, and the unmelted metal may be melted by the flame from the burner 19. Further, the electric arc furnace used in the above-described modified embodiment has the burners provided at every position between the electrodes. However, the present invention is not limited to such a configuration. For achieving more excellent uniform melting, the burners are preferably provided at every position between the electrodes.

The modified embodiments of the present invention have been described above in details but they are merely an example. The above-mentioned modified embodiment is an example in which three burners are provided in the furnace roof; however, the number of burners may be two, four, or more, and it may be a case where instead of the furnace shell being rotated, the electrodes and the burners are rotated.

Furthermore, the present invention is applicable to an electric arc furnace that melts metal other than steel and an operation method thereof. As such, the present invention can be realized in various modified forms insofar as they do not depart from the gist thereof.

The present application is based on the Japanese patent applications No. 2014-225630 filed on Nov. 5, 2014 and No. 2014-225634 filed on Nov. 5, 2014, which contents are incorporated herein by reference.

DESCRIPTION OF REFERENCE NUMERALS

10: electric arc furnace
12: circumferential wall portion
14: furnace bottom portion
16: furnace shell
18: charging opening
19: burner
20: furnace roof
22: electrode
26, 86: protruding portion
27, 65, 88: tapping hole
29, 91: slag door
30, 92: slag-door bottom portion
32: rotating apparatus
66: spout

What is claimed is:

1. A method of operating an electric arc furnace, wherein the electric arc furnace comprises:
    (a) a furnace shell that includes a charging opening, a cylindrical circumferential wall portion and a furnace bottom portion, and a tapping hole and/or a slag door,
    (b) a furnace roof that has a plurality of electrodes provided so as to face downwards, and
    (c) a rotating apparatus that rotates the furnace shell around a vertical axis relative to the electrodes,
    in which a metal material charged into the furnace shell is melted by heat of arcs formed between the electrodes and the metal material, wherein the method comprises:
        charging the metal material into the furnace shell via the charging opening, and thereafter,
        rotating the furnace shell relative to the electrodes during melting of the metal material, and
        stopping the rotation when any one of the plurality of electrodes reaches a holding position that is previously set relative to the tapping hole or the slag door, and holding the furnace shell at the holding position,
    in the case where the holding position is set relative to the tapping hole, the holding position is set in such a position that an extension line of a line connecting a rotational center of the furnace shell to any one of the plurality of electrodes is positioned in a range within ±50° in a rotation direction of the furnace shell, centered at a line connecting the rotational center of the furnace shell to a center of the tapping hole, and in the case where the holding position is set relative to the slag door, the holding position is set in such a position that the extension line of the line connecting the rotational center of the furnace shell to any one of the plurality of electrodes one electrode is positioned in a range of an angle of less than 60° from an end of the slag door in the rotation direction of the furnace shell.

2. The method of operating an electric arc furnace according to claim 1, wherein the electric arc furnace is an EBT furnace having the tapping hole, in which the furnace bottom portion has a protruding portion that partially protrudes outwards from an outer surface of the circumferential wall portion in a radial direction, and the tapping hole is configured by an opening that passes through the protruding portion in a vertical direction.

3. The method of operating an electric arc furnace according to claim 1, wherein the electric arc furnace is a spout tapping electric arc furnace having the tapping hole, in which the tapping hole is configured by an opening that passes through the circumferential wall portion in an inward and outward direction, and the spout tapping electric arc furnace has a spout extending outwards from the tapping hole.

4. The method of operating an electric arc furnace according to claim 1, wherein the rotating apparatus makes the furnace shell rotate in a circumferential direction while the electrodes are fixed with respect to a rotational direction.

5. The method of operating an electric arc furnace according to claim 1, wherein, during said rotating, the furnace shell is made to rotate in a circumferential direction while the electrodes are fixed with respect to a rotational direction.

6. The method of operating an electric arc furnace according to claim 1, wherein said rotating is performed after the electrode bores the scrap.

7. The method of operating an electric arc furnace according to claim 1, wherein said charging is performed multiple times.

8. The method of operating an electric arc furnace according to claim 1,
wherein the electric arc furnace further comprises a burner provided on the furnace roof so as to face downwards in a position between the electrodes which are adjacent to each other in a circumferential direction, and
wherein said rotating comprises rotating the furnace shell relative to the electrodes and the burner during melting of the metal material.

* * * * *

UNITED STATES PATENT AND TRADEMARK OFFICE
CERTIFICATE OF CORRECTION

PATENT NO. : 10,215,494 B2
APPLICATION NO. : 14/930775
DATED : February 26, 2019
INVENTOR(S) : N. Tomita et al.

Page 1 of 1

It is certified that error appears in the above-identified patent and that said Letters Patent is hereby corrected as shown below:

On the Title Page

Page 2, item [56], other publications Line 1, change "Backgroun" to -- Background --.

Signed and Sealed this
Thirteenth Day of August, 2019

Andrei Iancu
*Director of the United States Patent and Trademark Office*